(12) United States Patent
Seemann et al.

(10) Patent No.: US 12,044,587 B2
(45) Date of Patent: Jul. 23, 2024

(54) SENSOR DEVICE AND METHOD FOR DETERMINING A TORQUE OF A TORQUE TRANSMISSION APPARATUS

(71) Applicant: Karlsruher Institut für Technologie, Karlsruhe (DE)

(72) Inventors: Klaus Seemann, Durmersheim (DE); Harald Leiste, Weingarten (DE); Stefan Beirle, Amstetten (DE)

(73) Assignee: Karlsruher Institut für Technologie, Karlsruhe (DE)

( * ) Notice: Subject to any disclaimer, the term of this patent is extended or adjusted under 35 U.S.C. 154(b) by 476 days.

(21) Appl. No.: 17/344,723

(22) PCT Filed: Dec. 16, 2019

(86) PCT No.: PCT/EP2019/085298
§ 371 (c)(1),
(2) Date: Jun. 10, 2021

(87) PCT Pub. No.: WO2020/120795
PCT Pub. Date: Jun. 18, 2020

(65) Prior Publication Data
US 2022/0099506 A1 Mar. 31, 2022

(30) Foreign Application Priority Data
Dec. 14, 2018 (DE) ............... 10 2018 009 834.7

(51) Int. Cl.
*G01L 3/10* (2006.01)
(52) U.S. Cl.
CPC ................... *G01L 3/104* (2013.01)
(58) Field of Classification Search
CPC .......... G01L 3/102; G01L 3/105; G01L 3/104
See application file for complete search history.

(56) References Cited

U.S. PATENT DOCUMENTS

| 4,416,161 A * | 11/1983 | Barkhoudarian ....... G01L 3/102 73/862.28 |
| 7,261,005 B2 * | 8/2007 | Bunyer .................. G01L 3/105 73/728 |

(Continued)

FOREIGN PATENT DOCUMENTS

| CN | 102308117 A | 1/2012 |
| CN | 108351262 A | 7/2018 |

(Continued)

OTHER PUBLICATIONS

Decision to Grant received for Japanese Patent Application No. 2021-533670, mailed on Dec. 2, 2022, 5 pages (English translation submitted).

(Continued)

*Primary Examiner* — Octavia Hollington
(74) *Attorney, Agent, or Firm* — Shook, Hardy & Bacon L.L.P.

(57) ABSTRACT

The invention relates to a sensor apparatus, comprising: at least one ferromagnetic element, which, in an operating state, can be arranged on a torque transmission apparatus; and a measuring apparatus, which has at least one measuring element. Each measuring element is configured to measure a ferromagnetic resonance frequency of at least one ferromagnetic element. The measuring apparatus is configured to determine a torque of the torque transmission apparatus on the basis of a shift in the measured ferromagnetic resonance frequency. The invention further relates to a method for determining a torque of a torque transmission apparatus.

16 Claims, 20 Drawing Sheets

(56) References Cited

U.S. PATENT DOCUMENTS

| | | | |
|---|---|---|---|
| 8,465,374 | B2 | 6/2013 | Maier et al. |
| 8,689,643 | B2 * | 4/2014 | Grab ............... F16C 33/586 |
| | | | 73/862.335 |
| 10,845,257 | B2 | 11/2020 | Stephan et al. |
| 11,402,237 | B2 * | 8/2022 | Buchenau ............... G01D 5/22 |
| 2007/0034022 | A1 | 2/2007 | Bunyer et al. |
| 2011/0103173 | A1 * | 5/2011 | May ............... G01L 3/102 |
| | | | 324/207.16 |
| 2014/0159710 | A1 | 6/2014 | Yu et al. |

FOREIGN PATENT DOCUMENTS

| | | |
|---|---|---|
| FR | 2700846 A1 | 7/1994 |
| JP | S61-82126 A | 4/1986 |
| JP | 2545365 B2 * | 10/1996 |
| JP | 6080020 B2 | 2/2017 |
| WO | 2013/147268 A1 | 10/2013 |
| WO | 2016/162028 A1 | 10/2016 |
| WO | 2020/120795 A1 | 6/2020 |

OTHER PUBLICATIONS

Bechtold, C., et al., "Non-contact strain measurements based on inverse magnetostriction", Sensors and Actuators A 158, pp. 224-230 (2010).

Mori, O., et al., "Ferromagnetic resonance and stress of magnetic thin film by microstrip probe", Toei Scientific Industrial Co., Ltd., Tohoku Gakuin University, p. 1 (2016).

International Preliminary Report on Patentability received for PCT Application No. PCT/EP2019/085298, mailed on Jun. 24, 2021, 18 pages. (English translation submitted).

Notice of Reasons for Refusal and Search Report received for Japanese Patent Application No. 2021-533670, mailed on Aug. 19, 2022, 23 pages. (English translation submitted).

International Search Report and International Preliminary Examination Report Mailed Apr. 2, 2020 in International Patent Application No. PCT/EP2019/085298.

Krüger, K., Seemann, K., Leiste, H., Stüber, M., & Ulrich, S. (2013). High-frequency magnetoelastic measurements on Fe—Co—Hf—N/Ti—N multilayer coatings. Journal of magnetism and magnetic materials, 343, 42-48.

* cited by examiner

SENSOR DEVICE AND METHOD FOR DETERMINING A TORQUE OF A TORQUE TRANSMISSION APPARATUS

CROSS-REFERENCE TO RELATED APPLICATIONS AND PRIORITY

This non-provisional patent application is a 371 national phase of international application no. PCT/EP2019/085298, filed on Dec. 16, 2019, which claims priority to German patent application no. 10 2018 009 834.7, filed on Dec. 14, 2018. These applications are both incorporated herein by reference in the entirety.

SUMMARY

The invention relates to a sensor apparatus and a method for determining a torque of a torque transmission device, in particular a loaded shaft.

The invention is from the field of mechanical engineering (for example vehicle technology, aerospace technology), in particular from the field of measurement technology for determining torques. In particular, rotating parts subject to an alternating load are poorly or not directly electrically contactable, so that a contactless measurement of their torques has to take place in real time.

Berthold et al. ("Non-contact strain measurements based on inverse magnetostriction", Sensors and Actuators A 158 (2010) 224-230) describes a measurement technique for measuring magnetostrictive reactions based on a frequency mixing method. To this end, a magnetic field with two frequencies is used, the presence of a magnetic material generating new peak values of the FFT spectrum of the measurement signal, which are specific to the non-linear magnetization curve. Since the magnetization curve can be changed by mechanical tension, the amplitudes of the peak values can exhibit a characteristic dependence on a measure of the tension of the material. The contents of Berthold et al. ("Non-contact strain measurements based on inverse magnetostriction", Sensors and Actuators A 158 (2010) 224-230) are hereby included in full as part of the description.

US 2014/159710 A1 describes a contactless detection device comprising a first magnetic ring, a second magnetic ring, a first magnetic sensor, a second magnetic sensor, and a controller. The two magnetic rings are each attached to two ends of a torsion shaft. When the torsion shaft rotates, the controller detects the magnetic fields of the two magnetic rings through the two magnetic sensors. Based on the detected magnetic fields, the controller simultaneously calculates a twisting torque applied to the torsion shaft and a rotation angle of the torsion shaft. The contents of US 2014/159710 A1 are hereby included in full as part of the description.

WO 2016/162028 A1 describes an assembly and a method for contactless measurement of a moment on a machine element extending in an axis utilizing the inverse magnetostrictive effect. The machine element has permanent magnetization that is designed at least within an axial portion of the machine element and is aligned parallel to a radially aligned straight line. The permanent magnetization preferably has exactly two poles arranged diametrically opposite to one another with respect to the axis. The assembly further comprises at least one magnetic field sensor designed to measure at least an axial directional component of a magnetic field caused by the permanent magnetization and the moment or an axial directional component of a change in the magnetic field caused by the permanent magnetization and the moment. The contents of WO 2016/162028 A1 are hereby included in full as part of the description.

It is therefore an object of the invention to provide a sensor apparatus and a method for determining a torque of a torque transmission device with increased efficiency and improved reliability of the measured values.

The object is achieved by a sensor apparatus and a method for determining a torque of a torque transmission device according to the independent claims. Preferred embodiments are the subject of the dependent claims.

One aspect relates to a sensor apparatus, comprising at least one ferromagnetic element, which can be arranged on a torque transmission device, in particular a drive shaft, in an operating state, and a measuring device comprising at least one measuring element, in particular at least one measuring head, wherein each measuring element is configured to measure a ferromagnetic resonance frequency of at least one ferromagnetic element, wherein the measuring device is configured to determine a torque of the torque transmission device based on the measured ferromagnetic resonance frequency and/or a shift in the measured ferromagnetic resonance frequency.

In the context of the invention, it has been recognized in particular that based on the measured ferromagnetic resonance frequency or the shift in the measured resonance frequency, a particularly efficient and inexpensive method for determining the applied torque, which changes a magnetic anisotropy field of the at least one ferromagnetic element by means of generated torsional forces, is possible.

In the context of this description, the operating state is to be understood as the state in which the at least one ferromagnetic element is arranged on the torque transmission device and in which the at least one measuring element is arranged to measure the ferromagnetic resonance frequency of at least one ferromagnetic element.

Here, the at least one ferromagnetic element can in particular comprise at least one ferromagnetic material, wherein the at least one ferromagnetic element is preferably designed as at least one soft magnetic ferromagnetic element. Soft magnetic in this context is to be understood such that the at least one soft magnetic ferromagnetic element has a coercive field strength of less than 1200 A/m, preferably less than 1000 A/m and/or more than 0A/m, preferably more than 300 A/m. In this way, high-frequency losses based on precession damping of the magnetic moments can be minimized, and thus a reliable measurement of the ferromagnetic resonance frequency can be guaranteed.

Here, in particular a soft magnetic ferromagnetic element with a coercive field strength smaller than an anisotropy field strength or a uniaxial anisotropy field strength of the magnetic anisotropy field can be selected. The coercive field strength can have a value of preferably a maximum of $\frac{2}{3}$ of the anisotropy field strength, more preferably a maximum of $\frac{1}{3}$ of the anisotropy field strength and/or a value of preferably at least $\frac{1}{5}$ of the anisotropy field strength, more preferably at least $\frac{1}{4}$ of the anisotropy field strength. The at least one soft magnetic ferromagnetic element can thus be selected with a coercive field strength of less than 1000 A/m at an anisotropy field strength of e.g. 3000 A/m.

The at least one ferromagnetic element can in particular be designed as at least one ferromagnetic magnetostrictive element. Here, magnetostrictive materials can react to an applied mechanical tension, in particular according to the Villari effect, by changing their magnetization.

Furthermore, in particular at least one permanent magnet and/or at least one electromagnet can be integrated into the at least one ferromagnetic element. Furthermore, in particular at least one permanent magnet and/or at least one electromagnet can be integrated into the torque transmission device. In particular, by integrating at least one permanent magnet into the torque transmission device, a power supply device in the torque transmission device can be avoided. In this way, anisotropy of the at least one ferromagnetic element can be stabilized and/or a measurement frequency of the measuring device can be varied.

Here, the at least one ferromagnetic element can furthermore be arranged on the torque transmission device in such a way that an unbalance of the torque transmission device is avoided. In other words, the at least one ferromagnetic element can be arranged on the torque transmission device in such a way that a rotation axis of the torque transmission device prior to the arrangement of the at least one ferromagnetic element on the torque transmission device corresponds substantially to a rotation axis of the torque transmission device after the arrangement of the at least one ferromagnetic element on the torque transmission device. Furthermore, the at least one ferromagnetic element can be arranged at least partially substantially axially symmetrically with respect to the rotation axis of the torque transmission device. This enables a stable position of a rotation axis of the torque transmission device.

The measuring device comprises at least one measuring element, each measuring element being configured to measure a ferromagnetic resonance frequency of at least one ferromagnetic element, the measuring device being configured to determine a torque of the torque transmission device based on a shift in the measured ferromagnetic resonance frequency. Here, the measuring device and/or the at least one measuring element can be configured, for example, to carry out stripline-based ferromagnetic resonance (FMR) measuring techniques and/or Vector Network Analyzer (VNA) FMR measuring techniques and/or pulsed inductive microwave magnetometry (PIMM) FMR measurement techniques.

Here, The theoretical background regarding the determination of the torque of the torque transmission device based on a shift in the measured ferromagnetic resonance frequency is explained using a square ferromagnetic element as an example, the square ferromagnetic element being arranged on an exemplary cylindrical shaft. To this end, reference is made in particular to FIG. 8, which exemplarily illustrates the variables used below. The square ferromagnetic element has a side length a. A rotation of the shaft around its axis by an angle $\varphi$ causes a deformation of the shaft, whereby the square ferromagnetic element is sheared by a shear angle $\gamma$. Thereby, a first diagonal $d_1$ of the square ferromagnetic element is stretched, while a second diagonal $d_2$ is compressed:

$$d_1 = a\sqrt{1 + \frac{1}{\cos^2(\gamma)} + 2\tan(\gamma)} \quad (1)$$

$$d_2 = a\sqrt{1 + \frac{1}{\cos^2(\gamma)} - 2\tan(\gamma)} \quad (2)$$

This results in a corresponding deformation:

$$\varepsilon_1 = \frac{d_1 - a\sqrt{2}}{a\sqrt{2}} = \sqrt{\frac{1}{2} + \frac{1}{2\cos^2(\gamma)} + \tan(\gamma)} - 1 \quad (3)$$

$$\varepsilon_2 = \frac{d_2 - a\sqrt{2}}{a\sqrt{2}} = \sqrt{\frac{1}{2} + \frac{1}{2\cos^2(\gamma)} - \tan(\gamma)} - 1 \quad (4)$$

Furthermore, the shear angle $\gamma$ can be determined based on the angle $\varphi$, the radius of the shaft r and the length of the shaft L:

$$\gamma = \frac{r}{L}\varphi \quad (5)$$

The angle $\varphi$ results from the torque Me, the length of the shaft L, the shear module G and the moment of inertia J:

$$\varphi = \frac{M_t L}{GJ} \quad (6)$$

Here, the moment of inertia J can be expressed by:

$$J = \frac{1}{2}\pi r^4 \quad (7)$$

Inserting equations (6) and (7) into equation (5), one obtains for the shear angle $\gamma$:

$$\gamma = \frac{2M_t}{\pi G r^3} \quad (8)$$

According to Hooke's law and equations (3), (4) and (8), the following formula results for the mechanical tension $\sigma$ on the surface of the square ferromagnetic element along one of the diagonals $d_i$:

$$\sigma = E\varepsilon_i = E_r(1 - v^2)\varepsilon_i \quad (9)$$

The dynamics of a thin ferromagnetic film with a uniaxial anisotropy in the plane of the film, the film being exposed to a high frequency field, is described by the Landau-Lifschitz-Gilbert formula. In particular, this results in the well-known Kittel formula for the ferromagnetic resonance frequency:

$$f_g = \frac{\tilde{\gamma}}{2\pi}\sqrt{(\mu_0 H_u)^2 + J_S \mu_0 H_u} \quad (10)$$

Here, $\tilde{\gamma}$ is the gyromagnetic constant, $\mu_0$ is the magnetic field constant, $J_S$ is the saturation polarization and $H_u$ is the amount of the uniaxial anisotropy field in the plane of the film.

When the square ferromagnetic film is loaded, in particular by a tension generated by a torque applied to the shaft, the ferromagnetic resonance frequency becomes dependent on said tension. In addition to the uniaxial anisotropy field $\vec{H}_u$ in the plane of the film, an effective magnetoelastic anisotropy field $\vec{H}_{me}$ generated by the tension must be taken into account:

$$\vec{H}_{\mathit{eff}} = \vec{H}_u + \vec{H}_{me} = \begin{pmatrix} 0 \\ H_u \\ 0 \end{pmatrix} + \begin{pmatrix} \frac{3\lambda_S}{J_S}\sigma \\ -\frac{3\lambda_S}{J_S}\sigma \\ 0 \end{pmatrix} = \begin{pmatrix} \frac{3\lambda_S}{J_S}\sigma \\ H_u - \frac{3\lambda_S}{J_S}\sigma \\ 0 \end{pmatrix} \quad (11)$$

Here, $\vec{H}_{u,\mathit{eff}}$ is the effective bi-axial anisotropy field in the plane of the film and $\lambda_S$ the saturation magnetostrictive constant. Thus, based on equation (11), it yields:

$$H_{u,\mathit{eff}} = \sqrt{\left[\frac{3\lambda_S}{J_S}\sigma\right]^2 + \left[H_u - \frac{3\lambda_S}{J_S}\sigma\right]^2} \quad (12)$$

Now, if one substitutes $H_{u,\mathit{eff}}$ for $H_u$ in equation (10), one obtains the tension-dependent ferromagnetic resonance frequency:

$$f_g = \frac{\tilde{\gamma}}{2\pi}\sqrt{(\mu_0 H_{u,\mathit{eff}})^2 + J_S \mu_0 H_{u,\mathit{eff}}} \quad (13)$$

It is thus possible to determine the torque applied to the shaft or the torque transmission device based on a measurement of the ferromagnetic resonance frequency or on a measurement of a shift in the ferromagnetic resonance frequency. In particular, this makes it possible to determine the applied torque with a single signal line and in real time. In particular, a pronounced ferromagnetic resonance (FMR), i.e. a resonance peak with a small half-width $\Delta f_{FMR}$ between ⅕ and ⅒ of the FMR, can enable a better resolution of the measurement signal and thus a more favorable signal-to-noise ratio. A measurement frequency of readout electronics of the sensor apparatus and/or the measuring device and/or the at least one measuring element or a frequency specified (in particular legally) for an industry define the ferromagnetic resonance frequency to be used or to be individually adapted by the sensor apparatus and/or the at least one ferromagnetic element. Thus, in particular, the sensor apparatus can be adapted as a function of the application.

In particular, at low frequencies f outside the ferromagnetic resonance frequency, a shift in an initial permeability or original permeability of the at least one ferromagnetic element to higher or lower values can be measured $$\left(\mu(f \to 0) \approx 1 + \frac{J_S}{\lambda_0 \cdot H_u}\right).$$

In this way, data acquisition can in particular be made more efficient and/or more flexible. In particular, also with a low measurement frequency (f→0), the scattering parameter $S_{11}$ is also dependent on the effective uniaxial anisotropy, which in turn is a function of the mechanical tension. As a result, the torque of a torque transmission device can also be determined from a measurement of the initial permeability (permeability at (f→0)) or of the scattering parameter $S_{11}$ for (f→0).

In particular, the at least one measuring element can be configured to measure or determine the ferromagnetic resonance frequency of the at least one ferromagnetic element by means of a frequency sweep. Here, in particular, a parameter profile of a physical parameter, for example the scattering parameter $S_{11}$, can be determined over a frequency interval of the measurement frequency, the measurement frequency being varied between a lower threshold value of the frequency interval and an upper threshold value of the frequency interval. The ferromagnetic resonance frequency can be determined, for example, by the minimum of the parameter profile of the scattering parameter $S_{11}$ or by an imaginary part (Lorentz curve-shaped resonance peak profile) of the frequency-dependent permeability, which can be calculated or evaluated using the $S_{11}$ data.

In particular, the at least one ferromagnetic element can have at least one ferromagnetic layer. Here, the ferromagnetic layer can be formed parallel to a surface of the torque transmission device, in particular in the operating state. Alternatively or in addition, the at least one ferromagnetic layer can be designed to be substantially plane. In the context of this description, substantially is to be understood as comprehensively low manufacturing and environmental-related deviations.

In particular, the at least one ferromagnetic element can have two or more ferromagnetic layers, wherein in particular a plurality, preferably each of the two or more ferromagnetic layers can be formed from a different ferromagnetic material than the other of the two or more ferromagnetic layers.

In particular, the at least one ferromagnetic element can have two or more ferromagnetic layers and at least one insulating, non-conductive separating layer, wherein at least one of the at least one insulating, non-conductive separating layers is arranged between two adjacent ferromagnetic layers of the two or more ferromagnetic layers. Here, each of the at least one insulating, non-conductive separating layer can in particular be configured to magnetically decouple the respective two adjacent ferromagnetic layers of the two or more ferromagnetic layers from one other or to prevent or reduce magnetic interaction between the respective adjacent ferromagnetic layers. Here, the at least one insulating, non-conductive separating layer can be formed e.g. from a non-conductive or poorly conductive material, so that the respective two adjacent ferromagnetic layers of the two or more ferromagnetic layers are magnetically substantially decoupled from one another or a magnetic interaction between the respective adjacent ferromagnetic layers is prevented or reduced.

In particular, the two or more ferromagnetic layers can have at least a first ferromagnetic layer and a second ferromagnetic layer. In particular, the first ferromagnetic layer can be made from at least a first ferromagnetic material and the second ferromagnetic layer can be made from at least a second ferromagnetic material. Furthermore, the first ferromagnetic layer can be separated from the second ferromagnetic layer by at least one insulating, non-conductive separating layer, as described above. In other words, the at least one ferromagnetic element can have at least one insulating, non-conductive separating layer arranged between the first ferromagnetic layer and the second ferromagnetic layer. The at least one insulating, non-conductive separating layer can in particular be configured to magnetically decouple the first ferromagnetic layer and the second ferromagnetic layer from one another or to prevent or reduce a magnetic interaction between these ferromagnetic layers.

In particular, the first ferromagnetic layer, which is formed from at least the first ferromagnetic material, and the second ferromagnetic layer, which is formed from at least the second ferromagnetic material, can have different ferromagnetic resonance frequencies. In particular, the at least one measuring element can be configured to measure or determine a respective ferromagnetic resonance frequency for each of the two or more ferromagnetic layers. Here, the at least one measuring element can in particular be configured to measure or determine a first ferromagnetic resonance frequency of the first ferromagnetic layer and a second ferromagnetic resonance frequency of the second ferromagnetic layer of the at least one ferromagnetic element. For example, two resonance maxima can be observed when the frequency-dependent permeability of the at least one ferromagnetic element is measured by means of the at least one measuring element.

In particular, the measuring device can be configured to determine a torque of the torque transmission device based on a shift in at least one of the ferromagnetic resonance frequencies measured for each of the two or more ferromagnetic layers. In particular, the measuring device can be configured to determine a torque of the torque transmission device based on a shift in the measured first ferromagnetic resonance frequency and/or the measured second ferromagnetic resonance frequency. In particular, the measuring device can be configured to determine a respective torque of the torque transmission device for each of the two or more ferromagnetic layers based on a shift in the respective measured ferromagnetic resonance frequency. For example, the measuring device can be configured to determine a first torque of the torque transmission device based on a shift in the measured first ferromagnetic resonance frequency, and to determine a second torque of the torque transmission device based on a shift in the measured second ferromagnetic resonance frequency. The measuring device can furthermore be configured to determine the torque of the torque transmission device based on an arithmetic mean of the first torque and the second torque, the measuring device not being limited to such a determination of the torque. In particular, the measuring device can use any algorithm for determining the torque based on a shift in at least one of the ferromagnetic resonance frequencies measured for each of the two or more ferromagnetic layers. For example, an arithmetic mean or weighted average of the torques respectively determined can be determined for each of the two or more ferromagnetic layers. Alternatively or in addition, the measuring device can be configured to apply any algorithm for determining the torque based on a shift in at least a subset of the ferromagnetic resonance frequencies measured for each of the two or more ferromagnetic layers.

In particular, the at least one ferromagnetic element can have at least a first ferromagnetic layer, a second ferromagnetic layer and a third ferromagnetic layer, and at least two insulating, non-conductive separating layers. Here, in particular, a first of the at least two insulating, non-conductive separating layers can be arranged between the first ferromagnetic layer and the second ferromagnetic layer. Furthermore, in particular a second of the at least two insulating, non-conductive separating layers can be arranged between the second ferromagnetic layer and the third ferromagnetic layer. The second ferromagnetic layer is preferably arranged between the first ferromagnetic layer and the third ferromagnetic layer.

In particular, the first ferromagnetic layer can be formed from a first ferromagnetic material, the second ferromagnetic layer from a second ferromagnetic material, and the third ferromagnetic layer from a third ferromagnetic material, wherein the first, second and third ferromagnetic layers have different ferromagnetic resonance frequencies. In particular, the first ferromagnetic layer has a first ferromagnetic resonance frequency, the second ferromagnetic layer has a second ferromagnetic resonance frequency, and the third ferromagnetic layer has a third ferromagnetic resonance frequency.

In particular, the third ferromagnetic layer can also be designed as a multilayer. The multilayer can comprise e.g. at least a first sublayer made of the first ferromagnetic material and at least a second sublayer made of the second ferromagnetic material, which are applied or arranged directly on top of one another. Preferably, no further insulating, non-conductive separating layer is arranged between the first sublayer and the second sublayer, whereby the first sublayer and the second sublayer are not magnetically decoupled from one another or a magnetic interaction between the first sublayer and the second sublayer is possible. As a result, the multilayer has a third ferromagnetic resonance frequency, which is in particular between the first ferromagnetic resonance frequency of the first ferromagnetic layer and the second ferromagnetic resonance frequency of the second ferromagnetic layer. Here, however, the multilayer is not restricted to two sublayers, but can in particular have two or more sublayers.

Here, however, the disclosure is not restricted to the fact that the third ferromagnetic layer is designed as a multilayer. Instead, each of the at least one ferromagnetic layer can be designed as a multilayer and comprise at least two sublayers made of different ferromagnetic materials.

The at least one measuring element can in particular be configured to measure or determine a first ferromagnetic resonance frequency of the first ferromagnetic layer, a second ferromagnetic resonance frequency of the second ferromagnetic layer, and a third ferromagnetic resonance frequency of the third ferromagnetic layer of the at least one ferromagnetic element.

In particular, the measuring device can be configured to determine a torque of the torque transmission device based on a shift in the measured first ferromagnetic resonance frequency and/or the measured second ferromagnetic resonance frequency and/or the measured third ferromagnetic resonance frequency. For example, the measuring device can be configured to determine a first torque of the torque transmission device based on a shift in the measured first ferromagnetic resonance frequency, to determine a second torque of the torque transmission device based on a shift in the measured second ferromagnetic resonance frequency, and to determine a third torque of the torque transmission device based on a shift in the measured third ferromagnetic resonance frequency. The measuring device can furthermore be configured to determine the torque of the torque transmission device based on e.g. an arithmetic mean of the first torque, the second torque and the third torque, the measuring device, however, not being limited to such a determination of the torque.

Advantages of using at least one ferromagnetic element with more than one ferromagnetic resonance frequency lie in the simultaneous measurement of the ferromagnetic resonance frequencies in real time. In particular, by measuring several ferromagnetic resonance frequencies at the same time, it is possible to achieve an increased measurement effect and thus a better resolution. Furthermore, an improved compensation of a possible temperature influence, for example in the case of a gearbox in a warm oil bath, can thereby be made possible. Furthermore, axial forces in a torque transmission device, which influence a measurement of the torque, can also be detected in an improved manner.

In particular, each of the at least one ferromagnetic layer can each have a thickness of at most approx. 500 µm, preferably at most approx. 1 µm and/or at least approx. 50 nm, preferably at least approx. 150 nm. It must be taken into account here that, in particular depending on the material of the respective at least one ferromagnetic layer, a larger value of the thickness of the respective at least one ferromagnetic layer or a larger volume of the respective at least one ferromagnetic layer can generate a stronger measurement signal and improve a signal-to-noise ratio. Thus, the thickness of the respective at least one ferromagnetic layer can be selected depending on e.g. the economic efficiency of the application of the sensor apparatus, the measuring accuracy of the measuring unit and/or the magnetic properties of the torque transmission device and/or an environment of the torque transmission device. However, this list of various parameters is not to be interpreted as restrictive.

In particular, the thickness of the respective at least one ferromagnetic layer and/or a thickness of the at least one ferromagnetic element can be substantially constant. Such a constant thickness can guarantee a reliable and reproducible measurement result.

In particular, the at least one ferromagnetic element can have at least one buffer layer or at least one intermediate layer, which in the operating state is arranged between the at least one ferromagnetic layer and the torque transmission device. Here, the at least one intermediate layer is configured to magnetically decouple the at least one ferromagnetic layer and the torque transmission device in the operating state. In particular, the at least one intermediate layer can be formed from a non-conductive or poorly conductive material. It must be taken into account here that in the operating state the magnetic properties of the at least one ferromagnetic element can be influenced by possible magnetic properties of the torque transmission device. For example, a torque transmission device formed from a ferromagnetic material can influence and/or change the ferromagnetic properties, in particular for example an anisotropy of the at least one ferromagnetic element. This can falsify the measurements of the ferromagnetic resonance frequency or make them impossible.

Thus, due to the at least one intermediate layer, the reliability, accuracy and reproducibility of the measurement results of the measuring device can be improved.

In particular, the at least one intermediate layer can have a thickness of at most approx. 500 μm, preferably at most approx. 5 μm and/or at least approx. 200 nm, preferably at least approx. 750 nm. However, the thickness of the at least one intermediate layer is not limited to such values. Instead, the thickness of the at least one intermediate layer can be adapted to the magnetic properties of the torque transmission device, for example. In particular, in a case in which the torque transmission device has ferromagnetic properties, for example if the torque transmission device is designed as a shaft made of ferritic steel, the thickness of the at least one intermediate layer, if necessary, can also be selected to be greater than 500 μm in order to magnetically decouple the at least one ferromagnetic layer and the torque transmission device in the operating state. Alternatively, the thickness of the at least one intermediate layer can also be implemented below 200 nm.

In particular, the at least one ferromagnetic element can have at least one substrate layer or at least one substrate which, in the operating state, is arranged between the at least one ferromagnetic layer and the torque transmission device. The at least one substrate can in particular be designed to protect the at least one ferromagnetic element from damage, for example from tearing. Furthermore, the at least one substrate can be designed to reinforce a connection between the at least one ferromagnetic element and the torque transmission device. To this end, for example, a material of the at least one substrate can be selected such that a simple connection to the torque transmission device is made possible. Thus, by matching the materials of the at least one substrate and the torque transmission device, a secure fit of the at least one ferromagnetic element on the torque transmission device can be made possible.

Alternatively or in addition, the at least one substrate can have a surface structuring, for example a surface roughening and/or a surface patterning, in order to increase a total area of the surface of the at least one substrate. Such an increase in the total area of the surface of the at least one substrate can enable a secure connection of the at least one substrate to the at least one intermediate layer and/or to the at least one ferromagnetic layer on a side facing away from the torque transmission device in the operating state. Furthermore, such an increase in the total area of the surface of the at least one substrate on a side facing the torque transmission device in the operating state can enable a secure connection of the at least one substrate to the torque transmission device.

The at least one substrate can furthermore be designed in particular as a carrier layer and/or as a carrier plate. Here, the at least one substrate can in particular be designed to protect the at least one ferromagnetic element or the at least one ferromagnetic layer from damage and/or deformation during its transport and/or during an arrangement process of the at least one ferromagnetic element on the torque transmission device or to reduce such damage and/or deformation. The at least one substrate can have a thickness of preferably at most approx. 1 mm, more preferably at most approx. 500 μm and/or preferably at least approx. 1 μm, more preferably at least approx. 10 μm.

The at least one intermediate layer and/or the at least one substrate can in particular be configured to transmit a mechanical tension and/or a torque of the torque transmission device, preferably substantially completely, to the at least one ferromagnetic layer.

In particular, the at least one ferromagnetic element can be connectable to the torque transmission device in the operating state by gluing in order to transmit mechanical tension caused by the torque from the torque transmission device to the at least one ferromagnetic element. To this end, a suitable adhesive can be used, for example a two-component adhesive. A suitable adhesive in this context is to be understood as an adhesive suitable for gluing the at least one ferromagnetic element, in particular a material of the at least one ferromagnetic element, to the torque transmission device, in particular a material of the torque transmission device. The adhesive is preferably designed so as not to substantially influence or change the magnetic properties of the at least one ferromagnetic element, in particular a magnetic anisotropy field of the at least one ferromagnetic element.

In particular, the at least one ferromagnetic element can be connectable to the torque transmission device in the operating state by welding or material-connection in order to transmit mechanical tension caused by the torque from the torque transmission device to the at least one ferromagnetic element. In particular, welding can be carried out with or without welding filler materials. For example, the at least one ferromagnetic element can be connectable to the torque transmission device in the operating state by ultrasonic welding. Welding can preferably take place in an external static magnetic field, so that a uniaxial magnetic anisotropy field in the plane of the ferromagnetic element can either be kept unchanged or be adapted or generated in a controlled manner.

In particular, the at least one ferromagnetic element can be connectable to the torque transmission device in the operating state by pressing in order to transmit mechanical tension caused by the torque from the torque transmission device to the at least one ferromagnetic element.

In particular, the at least one ferromagnetic element can be connectable to the torque transmission device in the operating state by chemical reacting or by a chemical reaction in order to transmit mechanical tension caused by the torque from the torque transmission device to the at least one ferromagnetic element. In particular, the at least one ferromagnetic element can be designed such that a side of the at least one ferromagnetic element arranged on the torque transmission device in the operating state reacts chemically with the torque transmission device, for example by forming ionic and/or covalent bonds.

In particular, the at least one ferromagnetic element can be connectable to the torque transmission device in the operating state by latching or positive locking in order to transmit mechanical tension caused by the torque from the torque transmission device to the at least one ferromagnetic element. Here, the at least one ferromagnetic element can have at least one latching element, the at least one latching element being configured to engage in or latch with at least one corresponding latching element of the torque transmission device in the operating state.

In particular, the measuring device can be configured to determine the torque of the torque transmission device based on a shift in the measured ferromagnetic resonance frequency, taking into account an imperfect transmission of a mechanical tension caused by the torque via the connection of the torque transmission device and the at least one ferromagnetic element. In particular, the connection of the torque transmission device and the at least one ferromagnetic element can at least partially absorb and/or at least partially deflect the mechanical tension. Equation (12) can preferably be expanded by at least two correction parameters:

$$H_{u,\mathit{eff}} = \sqrt{\left[\frac{3\lambda_S}{J_S}(\sigma+\alpha)\beta\right]^2 + \left[H_u - \frac{3\lambda_S}{J_S}(\sigma+\alpha)\beta\right]^2} \quad (14)$$

The parameter $\alpha$ represents a pretension of the at least one ferromagnetic element caused by the connection, and the parameter $\beta$ represents an absorption or damping factor. Such a correction is shown exemplarily in FIG. 15.

In the event that the at least one ferromagnetic element comprises at least one intermediate layer and/or at least one substrate, the values for the pretension $\alpha$ and/or the damping factor $\beta$ can be adapted to take into account an imperfect transmission of the torque through the connection between the at least a substrate and the at least one intermediate layer and/or the at least one ferromagnetic layer, and/or between the at least one intermediate layer and the at least one ferromagnetic layer.

The measuring device can be configured to determine or specify the imperfect transmission of the mechanical tension through the connection between the torque transmission device and the at least one ferromagnetic element in at least one calibration step. In particular, the values for the pretension $\alpha$ and/or the damping factor $\beta$ can be prescribed by the measuring device and/or can be specified on the basis of the at least one calibration step and/or can be predetermined by a user.

In particular, in the operating state, a smallest distance between at least one measuring element and at least one ferromagnetic element can have a value of at most approx. 1500 μm, preferably at most approx. 500 μm, further preferably at most approx. 300 μm, most preferably at most approx. 150 μm.

In particular, during a measurement of the ferromagnetic resonance frequency of at least one ferromagnetic element, a measurement angle between a surface of the at least one measuring element and the at least one ferromagnetic element can have a value of at least approx. 0°, preferably at least approx. 12° and at most approx. 28°, preferably at most approx. 16°. Here, at least one region of the ferromagnetic element can come closer to the measuring device or an HF measuring head (in particular triplate stripline, as further described below) of the measuring device when a torque is applied to the torque transmission device, whereby easier coupling of HF field lines into the at least one ferromagnetic element is made possible in this measuring angle range. This can preferably cause an increased intensity of a measurement signal, since an HF field density toward the measuring head (and thus an absorbed or reflected response signal) consequently increases as the distance between the measuring head and the ferromagnetic element and with a favorable measuring angle becomes smaller. This can cause an increased measurement signal strength in particular in the case of torque measurements on torque transmission devices that do not rotate continuously approx. a rotation axis of the torque transmission device.

In particular, the torque transmission device can be designed as a shaft. The torque transmission device can preferably be designed substantially in the form of a cylinder and/or substantially axially symmetrical with respect to a rotation axis of the torque transmission device.

In particular, at least one measuring element of the at least one measuring element can be designed as a high-frequency triplate stripline, the measurement of the ferromagnetic resonance frequency being based in particular on a detuning of the high-frequency triplate stripline. Preferably, at least one measuring element of the at least one measuring element can be designed as a high-frequency triplate stripline, and a further measuring element of the at least one measuring element can be designed as a measuring element different from the high-frequency triplate stripline. The at least one measuring element can preferably comprise at least two substantially different measuring elements. In particular, the high-frequency triplate stripline can be designed for an impedance of approx. 50 ohms. Furthermore, the high-frequency triplate stripline can be operated in particular in a reflection mode of an electromagnetic high-frequency wave guided in a defined manner. Here, the detuning of the impedance or the high-frequency triplate stripline is caused by the partial or almost complete absorption of different electromagnetic wave amplitude ratios that arise in front of the high-frequency triplate stripline. In particular, the high-frequency triplate stripline can be configured to receive or measure at least one reflection signal in the reflection mode for measuring the ferromagnetic resonance frequency, wherein in particular the at least one reflection signal is determined or measured at a fixed measurement frequency. The fixed measurement frequency can in particular be close to the ferromagnetic resonance frequency, for example at least 0.8 times the ferromagnetic resonance frequency, preferably at least 0.9 times the ferromagnetic resonance frequency and/or a maximum of 1.2 times the ferromagnetic resonance frequency, preferably a maximum of 1.1 times the ferromagnetic resonance frequency. The fixed measurement frequency can in particular be at low frequencies, for example a maximum of 0.25 times the ferromagnetic resonance frequency, preferably a maximum of 0.1 times the ferromagnetic resonance frequency, more preferably a maximum of 0.05 times the ferromagnetic resonance frequency.

In contrast, in conventional striplines, ferromagnetic layers must be integrated directly into the stripline in order to measure the HF properties of the ferromagnetic layers. These measurements are not contact-free, since the ferromagnetic layer and a base substrate on which the ferromagnetic layer is arranged must lie between a signal line and a ground of the stripline in order to perform a measurement of frequency-dependent physical quantities, e.g. frequency-dependent permeability.

Here, the at least one ferromagnetic element and the at least one measuring element can be designed such that a natural frequency of the at least one measuring element is above a resonance frequency of the at least one ferromagnetic element. The natural frequency of at least one measuring element is in particular dependent on the size or length of the at least one measuring element. Thereby, in particular geometric effects of the at least one measuring element or of the at least one measuring head in the determination of the torque of the torque transmission device can be avoided or reduced.

In particular, the at least one measuring element can be arranged substantially along a measurement plane in the operating state, the measurement plane being substantially tangential to a surface of the torque transmission device. Here, however, the at least one measuring element is not restricted to such a shape, but can have other shapes. For example, the at least one measuring element can be substantially plate-like and/or substantially U-shaped and/or substantially at least partially annular.

In particular, in the operating state, the at least one measuring element can surround the torque transmission device e.g. substantially along a circumferential direction with respect to a rotation axis of the torque transmission device at least partially, for example over an angular range of at least 45°, preferably at least 90° and/or a maximum of 360°, preferably a maximum of 270°. Alternatively, in the operating state, the at least one measuring element can surround the torque transmission device e.g. substantially along a circumferential direction with respect to a rotation axis of the torque transmission device completely, for example substantially jacket-like.

In particular, the at least one ferromagnetic element can be designed as at least one circumferential ferromagnetic element, wherein in the operating state the at least one circumferential ferromagnetic element substantially completely surrounds the torque transmission device along a circumferential direction with respect to a rotation axis of the torque transmission device. Here, the at least one circumferential ferromagnetic element and the at least one measuring element can be arranged such that when the torque transmission device is loaded with a torque, continuous measurement of the ferromagnetic resonance frequency of the at least one circumferential ferromagnetic element is made possible.

For example, the at least one ferromagnetic element can be substantially plate-like and/or substantially U-shaped/V-shaped and/or substantially at least partially annular and/or substantially sleeve-like.

In particular, the at least one ferromagnetic element can comprise at least two ferromagnetic elements, the at least two ferromagnetic elements being arranged on the torque transmission device in a circumferential direction with respect to a rotation axis of the torque transmission device. In other words, the at least one ferromagnetic element can preferably comprise at least two ferromagnetic elements, the at least two ferromagnetic elements being arranged on the torque transmission device in such a way that the at least two ferromagnetic elements sequentially or one after the other move through or rotate through between the rotation axis and the at least one measuring element when the torque transmission device rotates approx. its rotation axis.

In particular, at least one of the at least two ferromagnetic elements can be designed to be substantially planar or flat and, in the operating state, can be oriented substantially parallel to a tangential plane of the surface of the torque transmission device. The at least one planar or flat ferromagnetic element can be arranged in particular in a recess of the torque transmission device. The at least one planar or flat ferromagnetic element can in particular at least partially form a projection on the torque transmission device.

In particular, at least one of the at least two ferromagnetic elements can be designed as a partially circumferential ferromagnetic element and, in the operating state, at least partially surround the torque transmission device along a circumferential direction with respect to a rotation axis of the torque transmission device. For example, at least one of the at least one ferromagnetic element can be designed substantially in the form of a cylindrical shell and/or as a partial ring and/or as a half ring.

In particular, at least two of the at least one ferromagnetic element can each be designed as a circumferential ferromagnetic element and, in the operating state, completely surround the torque transmission device along a circumferential direction with respect to a rotation axis of the torque transmission device. The at least two circumferential ferromagnetic elements can be designed parallel to one another, wherein the at least two parallel circumferential ferromagnetic elements can be spaced apart in particular along an axial direction with respect to a rotation axis of the torque transmission device.

In particular, the at least one ferromagnetic element can have magnetic anisotropy. The magnetic anisotropy or a preferred direction of the at least one ferromagnetic element can in particular have been generated by annealing the at least one ferromagnetic element in an external static magnetic field. The annealing can in particular include a thermal treatment of the at least one ferromagnetic element, for example at high temperatures and/or near the melting point of a material of the at least one ferromagnetic element and/or the at least one ferromagnetic layer.

In particular, the measuring device can further comprise at least one magnetic field element, the at least one magnetic field element being configured to generate a magnetic field in the operating state in order to generate or influence a magnetic anisotropy in the at least one ferromagnetic element. Here, the at least one magnetic field element can have at least one permanent magnet and/or at least one electromagnet. In particular, the at least one magnetic field element can be configured to generate the magnetic anisotropy in a plane of the at least one ferromagnetic element, in particular during a measurement of the ferromagnetic resonance frequency of the at least one ferromagnetic element. The magnetic field generated by the at least one magnetic field element can in particular have a magnetic flux density of at most 50 mT, preferably at most 10 mT, particularly preferably at most 5 mT.

One aspect relates to a method for determining a torque of a torque transmission device, comprising arranging at least one ferromagnetic element on the torque transmission device, measuring a ferromagnetic resonance frequency of the at least one ferromagnetic element, and determining the torque of the torque transmission device based on a shift in the measured ferromagnetic resonance frequency.

The method can in particular include features according to any combination of the above-mentioned features of the sensor apparatus.

In particular, arranging the at least one ferromagnetic element can include gluing, welding, pressing, chemical reaction and/or latching of the at least one ferromagnetic element to the torque transmission device.

In particular, determining the torque of the torque transmission device can include taking into account an imperfect transmission of mechanical tension through a connection between the torque transmission device and the at least one ferromagnetic element. The method can further include, in particular, determining the imperfect transmission of the mechanical tension or determining physical parameters of the imperfect transmission of the mechanical tension through the connection between the torque transmission device and the at least one ferromagnetic element. The physical parameters can include, for example, a pretension a of the at least one ferromagnetic element caused by the connection and an absorption or damping factor, β, as stated in particular in equation (14).

In particular, the method can include producing at least one ferromagnetic layer. In particular, the at least one ferromagnetic layer can be produced by depositing a material of the at least one ferromagnetic layer, in particular by sputtering, preferably by magnetron sputtering.

In particular, producing at least one ferromagnetic layer can further comprise at least: producing a first ferromagnetic layer, producing a first insulating, non-conductive separating layer on the first ferromagnetic layer, and producing a second ferromagnetic layer on the first insulating, non-conductive separating layer. In particular, measuring the ferromagnetic resonance frequency of the at least one ferromagnetic element can further comprise at least: measuring or determining a first ferromagnetic resonance frequency of the first ferromagnetic layer and measuring or determining a second ferromagnetic resonance frequency of the second ferromagnetic layer. In particular, determining the torque of the torque transmission device can include at least determining the torque of the torque transmission device based on a shift in the measured first ferromagnetic resonance frequency and/or the measured second ferromagnetic resonance frequency.

In particular, the method can further comprise producing a substrate and producing an intermediate layer on the substrate, a ferromagnetic layer of the at least one ferromagnetic layer being produced on the intermediate layer, the intermediate layer being configured to magnetically decouple the at least one ferromagnetic layer and the torque transmission device in an operating state of the sensor apparatus.

In particular, the at least one ferromagnetic layer and/or an intermediate layer and/or a substrate can be applied directly to the torque transmission device.

In particular, the method can further include annealing (see above) of the at least one ferromagnetic element in an external static magnetic field in order to generate a magnetic anisotropy of the at least one ferromagnetic element. In particular, by specifying the external static magnetic field, a desired magnetic anisotropy of the at least one ferromagnetic element can thereby be set.

Furthermore, two exemplary ferromagnetic elements are described, each with an exemplary production method.

Example 1

As part of a first example, an exemplary ferromagnetic element and an exemplary production method for the exemplary ferromagnetic element are described.

To this end, in particular a polished tungsten carbide-cobalt (WC—Co) hard metal substrate is provided. The WC—Co substrate here has 10.5% by weight of cobalt and dimensions of 12.7 mm×12.7 mm×0.4 mm (length×width×thickness).

A silicon oxide intermediate layer is applied to the WC—Co substrate by non-reactive RF magnetron sputtering in a pure argon atmosphere at 0.2 Pa. The silicon oxide intermediate layer is applied using a 6-inch $SiO_2$ sputtering target with a power of 300 W. As a result, a silicon oxide intermediate layer with a thickness of approx. 3 μm is applied to the WC—Co substrate, the silicon oxide intermediate layer having a chemical composition of approx. 1:2 (Si:O). In this context, approx. means comprising deviations of up to 15%.

A soft magnetic ferromagnetic iron-cobalt-hafnium-nitrogen (Fe—Co—Hf—N) layer is applied to the intermediate layer by reactive RF magnetron sputtering in an argon/nitrogen (Ar/$N_2$) atmosphere at 0.2 Pa. A gas flow ratio of Ar/$N_2$ is kept at 100 sccm/3 sccm. The Fe—Co—Hf—N layer is applied using a 6-inch $Fe_{37}Co_{46}Hf_{17}$ sputtering target with a power of 250 W. Thereby, an Fe—Co—Hf—N layer with a thickness of approx. 200 nm is applied on the WC—Co substrate, the Fe—Co—Hf—N layer having a chemical composition of approx. 32:45:11:12 (Fe:Co:Hf:N). In this context, approx. means comprising deviations of up to approx. 25% in each case.

After the silicon intermediate layer and the Fe—Co—Hf—N layer have been applied, the ferromagnetic element is annealed at 400° C. in a static magnetic field of 50 mT for 1 hour (see above). Here, annealing takes place in a vacuum with a pressure of $p<10^{-7}$ mbar, the annealing generating a uniaxial magnetic anisotropy of the ferromagnetic layer.

The annealed ferromagnetic element can also be connected to a torque transmission device, for example be glued to a shaft.

Example 2

As part of a second example, a further exemplary ferromagnetic element and a further exemplary production method for the exemplary ferromagnetic element are described.

To this end, a silicon (Si (1 0 0)) substrate is provided in particular. The Si substrate has dimensions of 9.9 mm×9.9 mm×0.4 mm (length×width×thickness). The Si substrate is further thermally oxidized and has a 1 μm intermediate layer of thermally oxidized silicon.

A ferromagnetic iron-cobalt-zirconium-nitrogen (Fe—Co—Zr—N) layer is applied to the intermediate layer by reactive RF magnetron sputtering in an argon/nitrogen (Ar/$N_2$) atmosphere at 0.2 Pa. A gas flow ratio of Ar/$N_2$ is kept at 100 sccm/3 sccm. The Fe—Co—Zr—N layer is applied using a 6-inch $Fe_{37}Co_{46}Zr_{17}$ sputtering target with a power of 250 W. Thereby, an Fe—Co—Zr—N layer with a thickness of approx. 788 nm is applied on the intermediate layer, the Fe—Co—Hf—N layer having a chemical composition of approx. 40:37:11:12 (Fe:Co:Zr:N). In this context, approx. means comprising deviations of up to approx. 25% in each case.

After the Fe—Co—Zr—N layer has been applied, the ferromagnetic element is annealed at 400° C. in a static magnetic field of 50 mT for 1 hour. Here, annealing takes place in a vacuum with a pressure of $p<10^{-7}$ mbar, the annealing generating a uniaxial magnetic anisotropy of the ferromagnetic layer.

The annealed ferromagnetic element can further be connected to a torque transmission device, for example be glued to a shaft.

BRIEF DESCRIPTION OF THE DRAWINGS

The invention is further described below on the basis of exemplary embodiments illustrated in the figures. The exemplary embodiments must not to be construed as restrictive here. The figures show.

DETAILED DESCRIPTION

Figure 1:
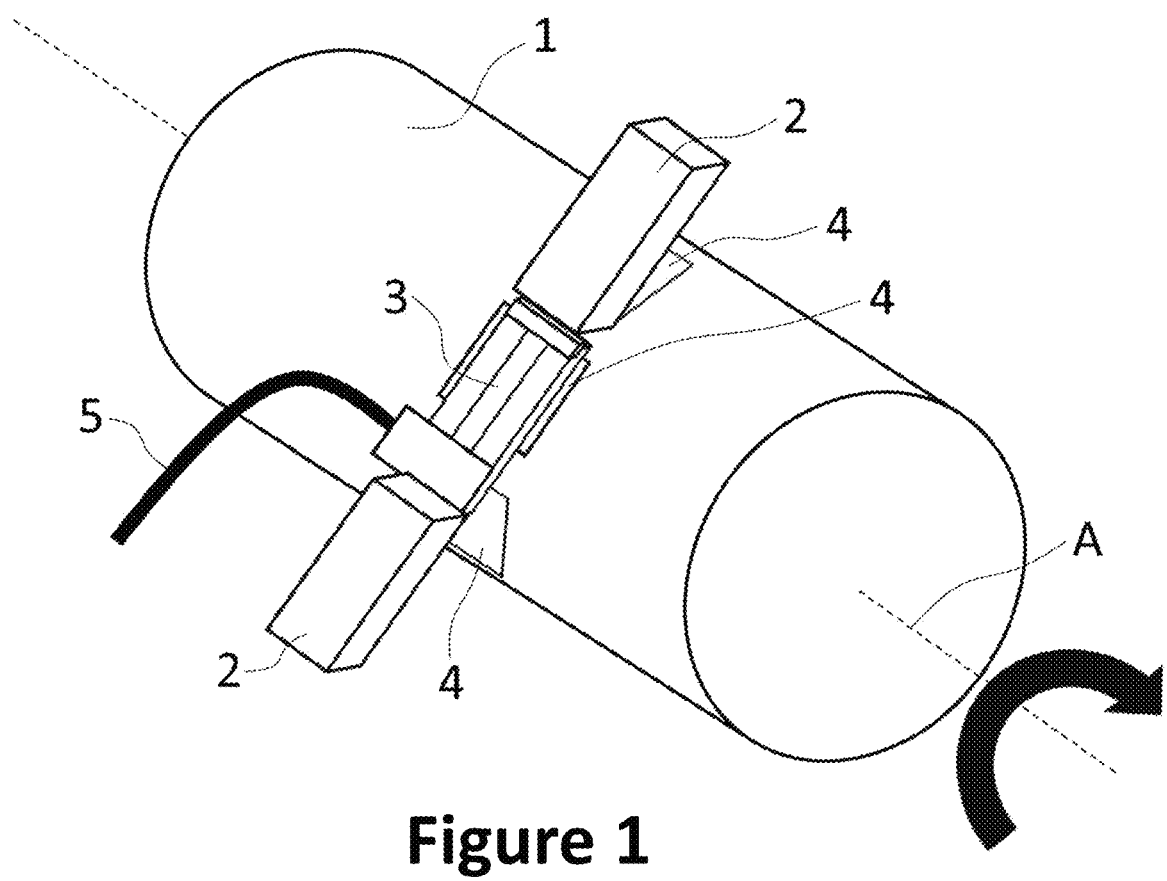
FIG. 1: A perspective view of a first exemplary sensor apparatus in the operating state.

FIG. 1 shows a perspective view of a first exemplary sensor apparatus in the operating state.

Here, a torque transmission device 1 is designed as a cylindrical shaft, the torque transmission device 1 being able to rotate approx. a rotation axis A in order to transmit a torque.

Six ferromagnetic elements 4 are arranged on the torque transmission device 1, of which three ferromagnetic elements 4 are concealed by the torque transmission device 1 due to the perspective view. The six ferromagnetic elements 4 are arranged in pairs, the ferromagnetic elements 4 arranged in pairs each being arranged opposite with respect to the rotation axis A of the torque transmission device 1. The ferromagnetic elements 4 are arranged in particular in the circumferential direction around the rotation axis A at equal distances from one another. In this way, the formation of an imbalance in the torque transmission device 1 with respect to a rotational movement approx. the rotation axis A can be avoided.

The six ferromagnetic elements 4 preferably each comprise at least one ferromagnetic, in particular soft magnetic ferromagnetic material.

The ferromagnetic elements 4 are each formed substantially square or the ferromagnetic elements 4 have, in particular in a respective plane perpendicular to a radial direction with respect to the rotation axis A, a substantially square cross-sectional area. The ferromagnetic elements 4 can each be designed to be substantially flat or planar or plate-like. In particular, the torque transmission device 1 has corresponding recesses on a circumferential surface of the torque transmission device 1, one ferromagnetic element 4 being received in each of the corresponding recesses.

By applying a torque to the torque transmission device 1, the ferromagnetic elements 4 experience a mechanical tension or a shear force. In other words, the ferromagnetic elements 4 are pretensioned by the application of the torque to the torque transmission device 1. As a result, a magnetic anisotropy or a magnetic anisotropy field along a plane of the ferromagnetic elements 4 is disturbed or changed, as a result of which the ferromagnetic resonance frequency of the ferromagnetic elements 4 is shifted.

This shift in the ferromagnetic resonance frequency of the ferromagnetic elements 4 is measured by a measuring element 3 of a measuring device. In particular, the measuring element 3 is arranged above the torque transmission device 1 in such a way that the ferromagnetic elements 4 rotate through between the rotation axis A and the measuring element 3 or move through around the rotation axis A when the torque transmission device 1 rotates.

The measuring element 3 can in particular be designed as a high-frequency triplate stripline.

The measuring element 3 of the measuring device can either determine a torque applied to the torque transmission device 1 directly based on the measured shift in the ferromagnetic resonance frequency or on the measured ferromagnetic resonance frequency, or forward measured data on the shift in the ferromagnetic resonance frequency or on the ferromagnetic resonance frequency. In particular, the measuring element 3 can be connected to a connecting element 5. The connecting element 5 can in particular be configured to transmit data and/or power. Furthermore, control signals can be transmitted to the measuring element 3 or the measuring device and/or the magnetic field element 2 through the connecting element 5.

FIG. 1 further shows a magnetic field element 2, the magnetic field element 2 being configured to generate a magnetic field, in particular between the measuring element 3 and the torque transmission device 1, in the operating state. During a rotational movement of the torque transmission device 1, the ferromagnetic elements 4 rotate one after the other, in particular into a measurement position between the measuring element 3 and the torque transmission device 1, the magnetic field element 2 being configured in particular to generate or influence magnetic anisotropy in a ferromagnetic element 4 in the measurement position. Thereby, the magnetic field element 2 can in particular generate or influence the magnetic anisotropy in a plane of the respective ferromagnetic element 4, in particular during a measurement of the ferromagnetic resonance frequency of the respective ferromagnetic element 4.

In FIG. 1, the magnetic field element 2 is shown only in part in order to also show the measuring element 3. A cross-sectional view of the magnetic field element 2 is shown in particular in FIG. 2. Here, the magnetic field element 2 is exemplarily designed as an electromagnet, the electromagnet having a substantially U-shaped magnetic core and a coil arranged on the magnetic core. However, the electromagnet is not limited to such a design. Alternatively, the magnetic element 2 can be designed as a permanent magnet, for example.

Figure 2:
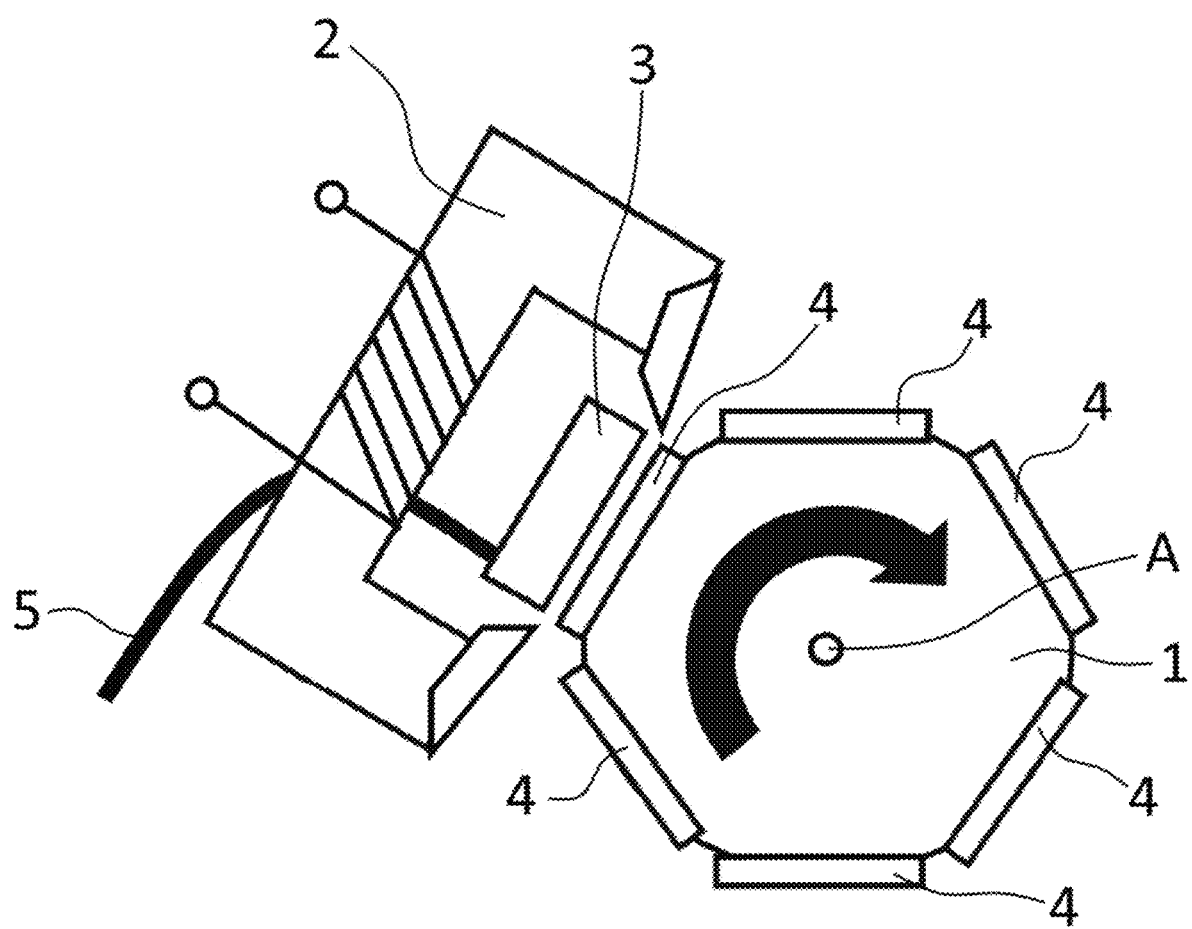
FIG. 2: A cross-sectional view of the sensor apparatus of FIG. 1.

FIG. 2 shows a cross-sectional view of the exemplary sensor apparatus shown in FIG. 1 along a sectional plane perpendicular to the rotation axis A through the measuring element 3, the magnetic field element 2, the ferromagnetic elements 4, and the torque transmission device 1. Here, the pairwise arrangement of the ferromagnetic elements 4 and a formation of the magnetic field element 2, as already described above for FIG. 1, is shown more clearly. In particular, a ferromagnetic element 4 is shown in the measurement position.

Figure 3:
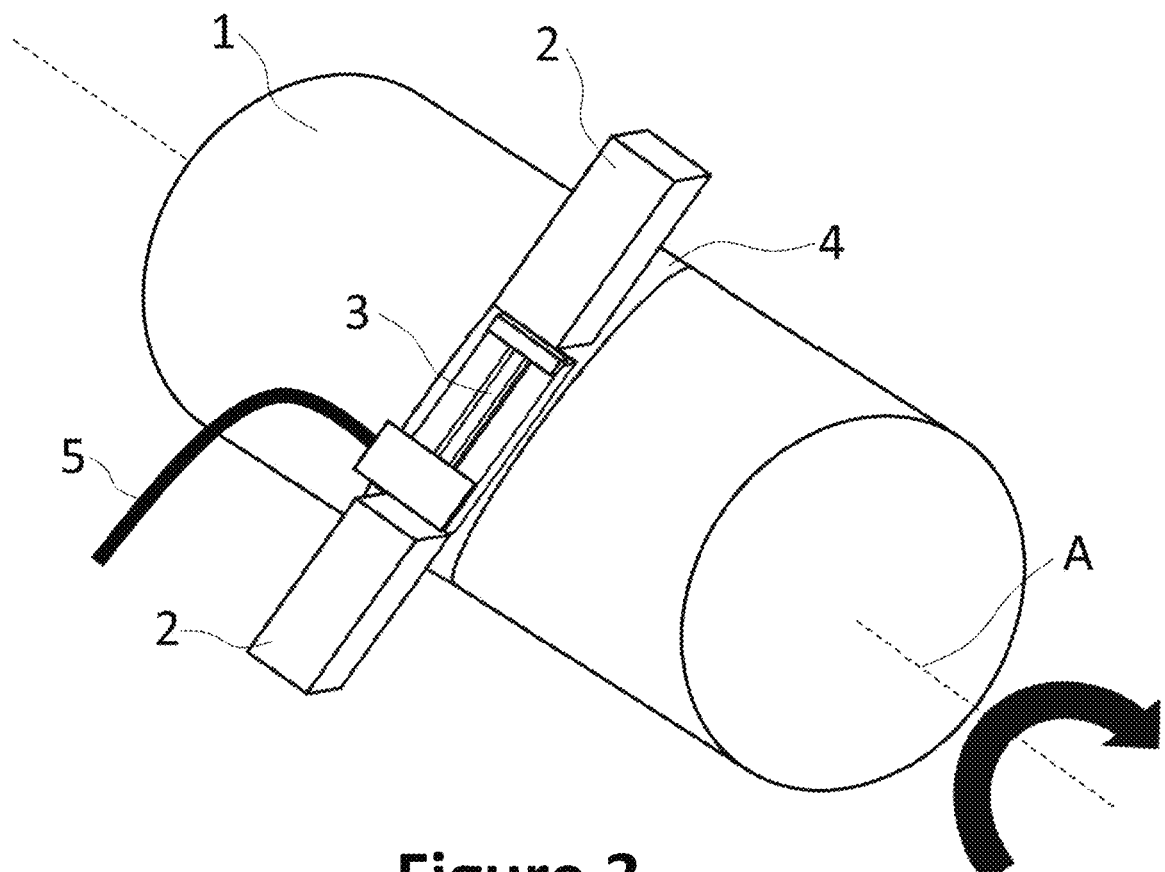
FIG. 3: A perspective view of a second exemplary sensor apparatus in the operating state.

FIG. 3 shows a perspective view of a second exemplary embodiment of a sensor apparatus. Here, the magnetic field element 2, the connecting element 5, the measuring element 3 and the torque transmission device 1 with the rotation axis A substantially correspond to the elements in FIGS. 1 and 2 identified with the same reference numerals.

A circumferential ferromagnetic element 4 is arranged on the torque transmission device 1, which element surrounds the torque transmission device 1 along a circumferential direction with respect to the rotation axis A completely. In this way, the formation of an imbalance in the torque transmission device 1 with respect to a rotational movement approx. the rotation axis A can be avoided. Furthermore, the circumferential ferromagnetic element 4 comprises in particular at least one ferromagnetic, in particular soft magnetic ferromagnetic material.

The circumferential ferromagnetic element 4 has a substantially constant diameter along a direction parallel to the rotation axis A. In particular, the torque transmission device 1 can have a corresponding recess on a circumferential surface of the torque transmission device 1, the circumferential ferromagnetic element 4 being received in the corresponding recess.

When a torque is applied to the torque transmission device 1, the circumferential ferromagnetic element 4 experiences mechanical tension. Thereby, a magnetic anisotropy or a magnetic anisotropy field is disturbed or changed in a portion of the circumferential ferromagnetic element 4 along a surface of the ferromagnetic element 4 circumferential with respect to the rotation axis A, whereby the ferromagnetic resonance frequency of the circumferential ferromagnetic element 4 is shifted.

The magnetic field element 2 is preferably configured to generate a magnetic field, in particular between the measuring element 3 and the torque transmission device 1, in the operating state. During a rotational movement of the torque transmission device 1, portions of the circumferential ferromagnetic element 4 rotate at least partially through a measurement position between the measuring element 3 and the torque transmission device 1, the magnetic field element 2 being configured to generate or influence a magnetic anisotropy in a respective portion of the circumferential ferromagnetic element 4 located in the measurement position. Thereby, the magnetic field element 2 can generate or influence the magnetic anisotropy of a respective portion of the circumferential ferromagnetic element 4 in particular during a measurement of the ferromagnetic resonance frequency of the circumferential ferromagnetic element 4.

Figure 4:
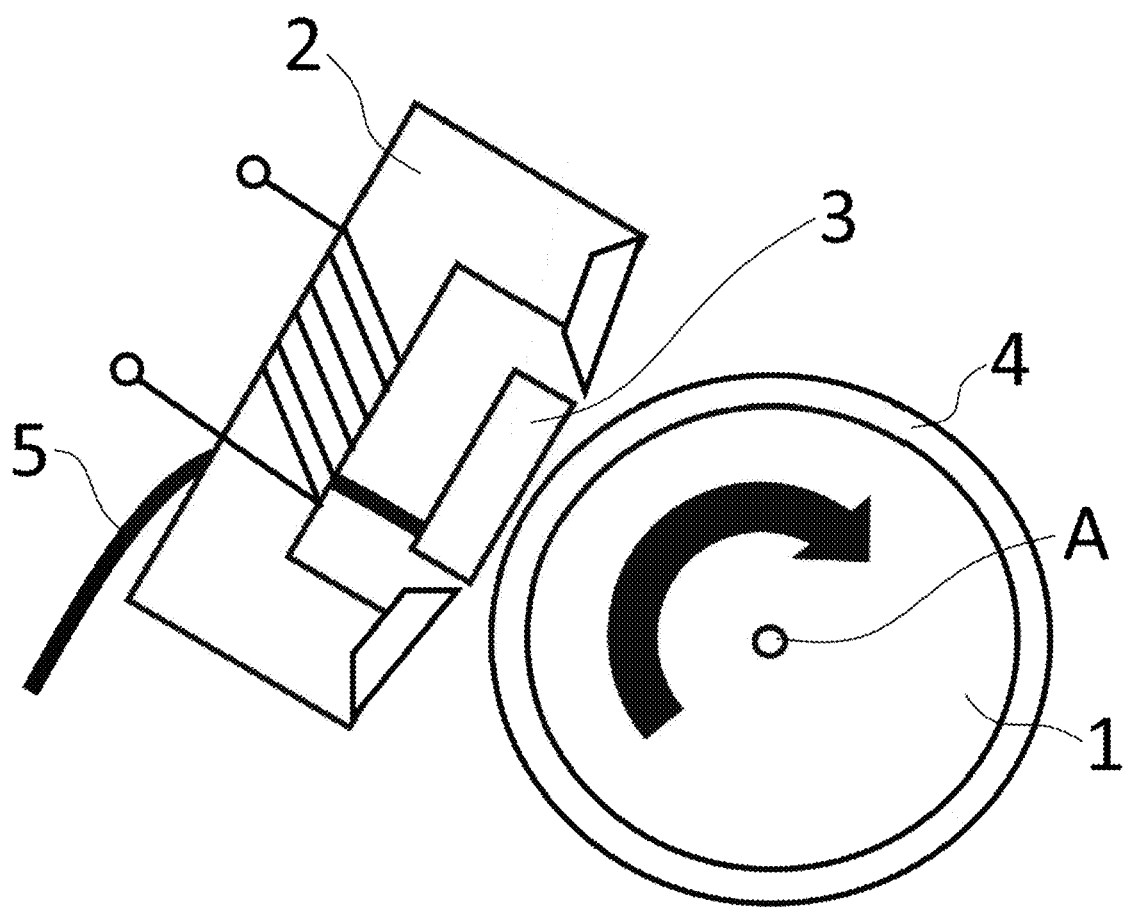
FIG. 4: A cross-sectional view of the sensor apparatus of FIG. 3.

As in FIG. 1, the magnetic field element 2 is only partially shown in FIG. 3 in order to also show the measuring element 3. A cross-sectional view of the magnetic field element 2 is shown in FIG. 4. Here, the magnetic field element 2 is designed, for example, as an electromagnet, the electromagnet having a substantially U-shaped magnetic core and a coil arranged on the magnetic core. However, the electromagnet is not limited to such a design. Alternatively, the magnetic element 2 can be designed as a permanent magnet, for example.

FIG. 4 shows a cross-sectional view of the exemplary sensor apparatus shown in FIG. 3 along a sectional plane perpendicular to the rotation axis A through the measuring element 3, the magnetic field element 2, the circumferential ferromagnetic element 4, and the torque transmission device 1. Here, the circumferential arrangement of the circumferential ferromagnetic element 4 and a design of the magnetic field element 2, as already described above for FIG. 3, are shown more clearly. In particular, it is shown that with each rotational movement of the torque transmission device 1 approx. the rotation axis A, a portion of the circumferential ferromagnetic element 4 is arranged in the measurement position.

Figure 5:
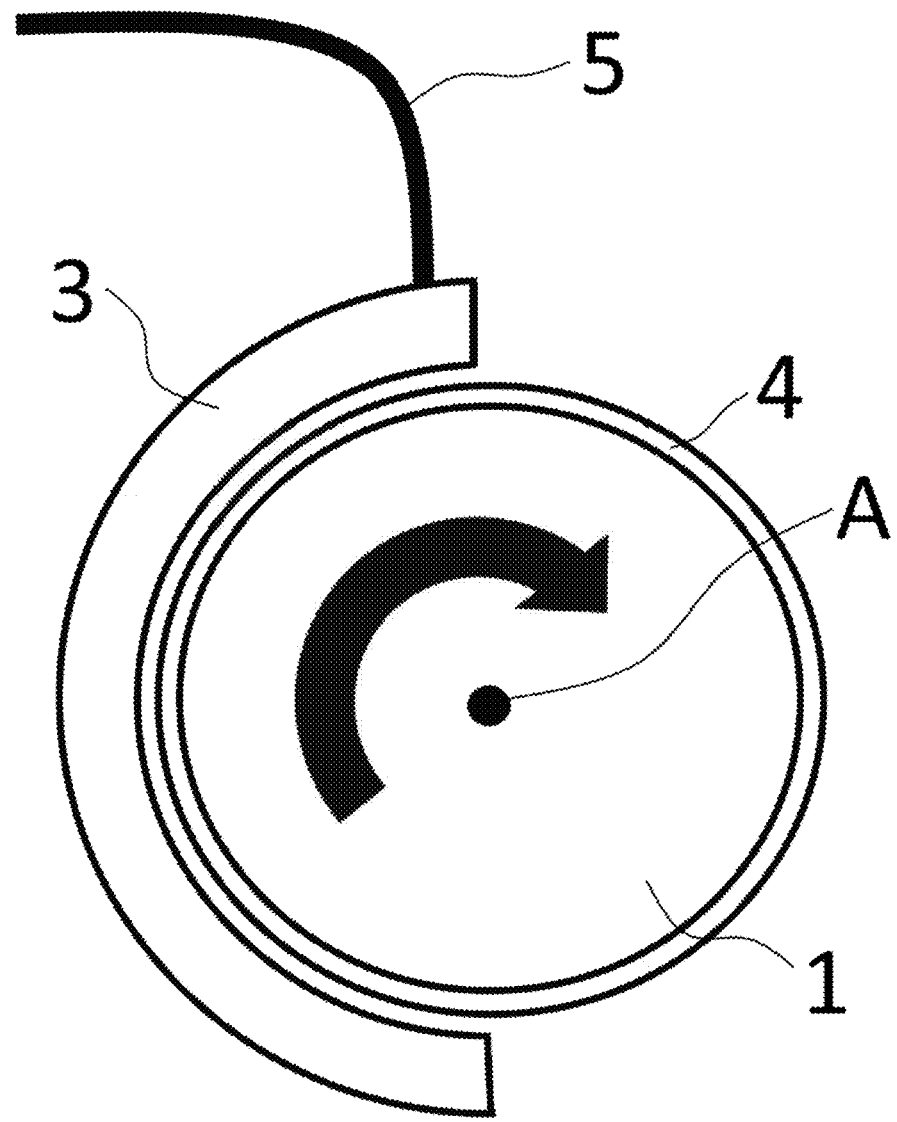
FIG. 5: A cross-sectional view of a third exemplary sensor apparatus in the operating state.

FIG. 5 shows a cross-sectional view of a third exemplary embodiment of a sensor apparatus. Here, the torque transmission device 1 with the rotation axis A, the circumferential ferromagnetic element 4 and the connecting element 5 substantially correspond to the elements identified with the same reference numerals in FIGS. 3 and 4.

By application of a torque to the torque transmission device 1, the circumferential ferromagnetic element 4 experiences mechanical tension. As a result, magnetic anisotropy or a magnetic anisotropy field is disturbed or changed in a portion of the circumferential ferromagnetic element 4 along a surface of the ferromagnetic element 4 circumferential with respect to the rotation axis A, whereby the ferromagnetic resonance frequency of the circumferential ferromagnetic element 4 is shifted.

This shift in the ferromagnetic resonance frequency of the circumferential ferromagnetic element 4 is measured by a measuring element 3 of a measuring device. The measuring element 3 is preferably arranged above the torque transmission device 1 such that, upon rotational movement of the torque transmission device 1, portions of the circumferential ferromagnetic element 4 rotate at least partially through between the rotation axis A and the measuring element 3 or move through in a circumferential direction around the rotation axis A.

Furthermore, the measuring element 3 is designed as a circumferential measuring element 3 and configured to surround the torque transmission device 1 at least partially along a circumferential direction with respect to the rotation axis A. In particular, the circumferential measuring element 3 surrounds the torque transmission device 1 along the circumferential direction to an extent of substantially approx. 50%. However, the circumferential measuring element 3 is not restricted to approx. 50%, but can surround the torque transmission device 1 along the circumferential direction to an extent of substantially less or more than 50%. Furthermore, the circumferential measuring element 3 is configured such that, in the operating state, a radial distance between the circumferential measuring element 3 and the circumferential ferromagnetic element 4 with respect to the rotation axis A is substantially constant.

The circumferential measuring element 3 can be designed, for example, as a high-frequency triplate stripline, in particular as a curved high-frequency triplate stripline.

The circumferential measuring element 3 of the measuring device can either determine a torque applied to the torque transmission device 1 directly based on the measured shift in the ferromagnetic resonance frequency or on the measured ferromagnetic resonance frequency, or forward measured data of the shift in the ferromagnetic resonance frequency or the ferromagnetic resonance frequency. Here, the measuring element 3 can be connected to the connecting element 5. The connecting element 5 can preferably be configured to transmit data and/or power. Furthermore, control signals can be transmitted to the measuring element 3 or the measuring device through the connecting element 5.

Since the measuring element 3 is designed as a circumferential measuring element 3, it is difficult or impossible to generate an external magnetic field by means of a magnetic field element 2. The shift in the ferromagnetic resonance frequency or the ferromagnetic resonance frequency can be measured by the circumferential measuring element 3 e.g. based on a shape anisotropy generated by the applied torque in the circumferential ferromagnetic element 4. The circumferential ferromagnetic element 4 can preferably have a small width, measured along a direction parallel to the rotation axis A. In particular, the width of the circumferential ferromagnetic element 4 can have a smaller value than a width of the circumferential measuring element 3, measured along a direction parallel to the rotation axis A. For example, the width of the circumferential ferromagnetic element 4 can have a value of a maximum of 90%, preferably a maximum of 80%, more preferably a maximum of 50% and/or at least 10%, preferably at least 20% of the value of the width of the circumferential measuring element 3.

Figure 6:
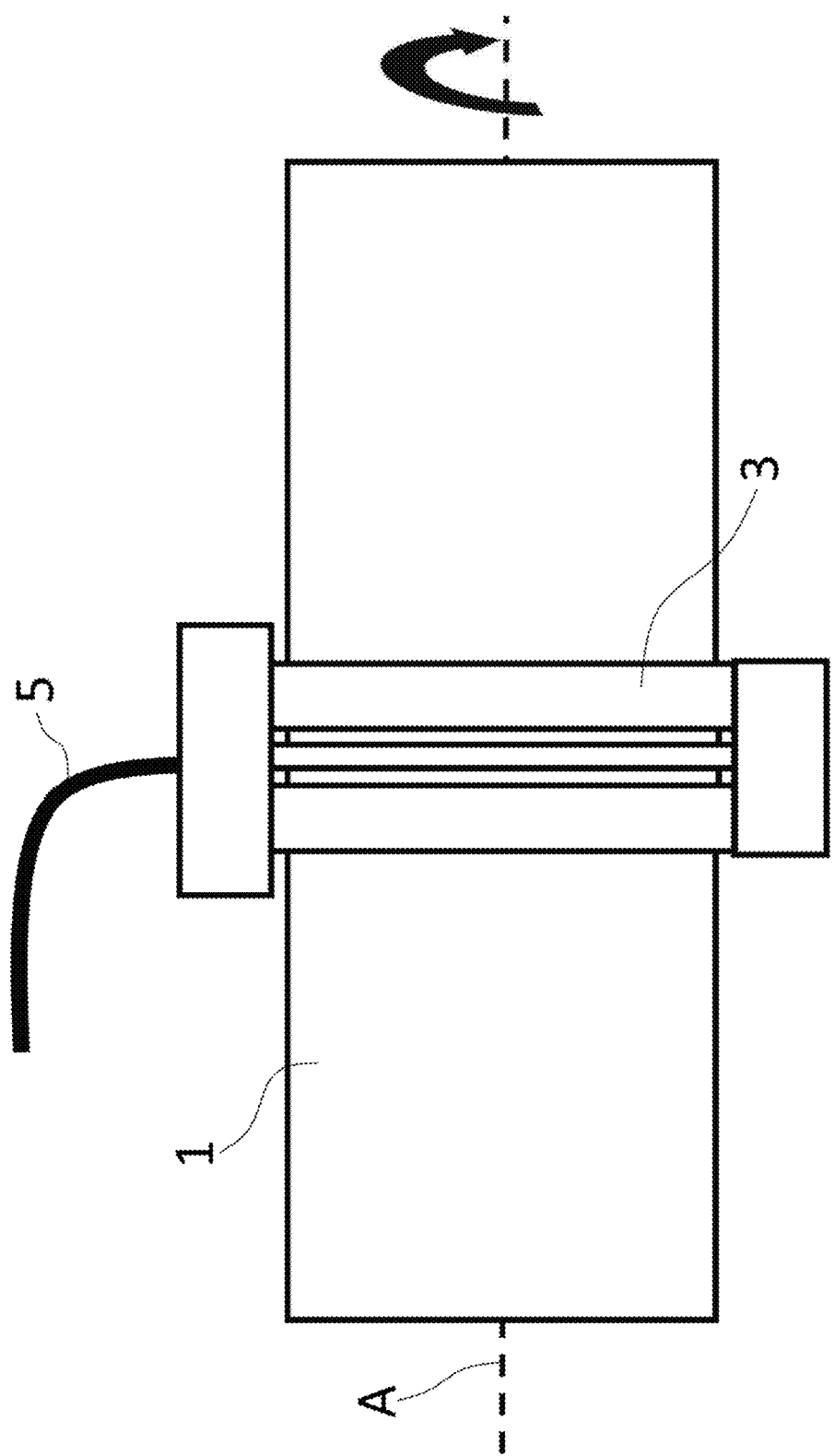
FIG. 6: A side view of the sensor apparatus of FIG. 5.

FIG. 6 shows a side view of the exemplary embodiment shown in FIG. 5, with a relative design of the circumferential ferromagnetic element 4 and the circumferential measuring element 3, as described above for FIG. 5, being shown in particular.

Figure 7:
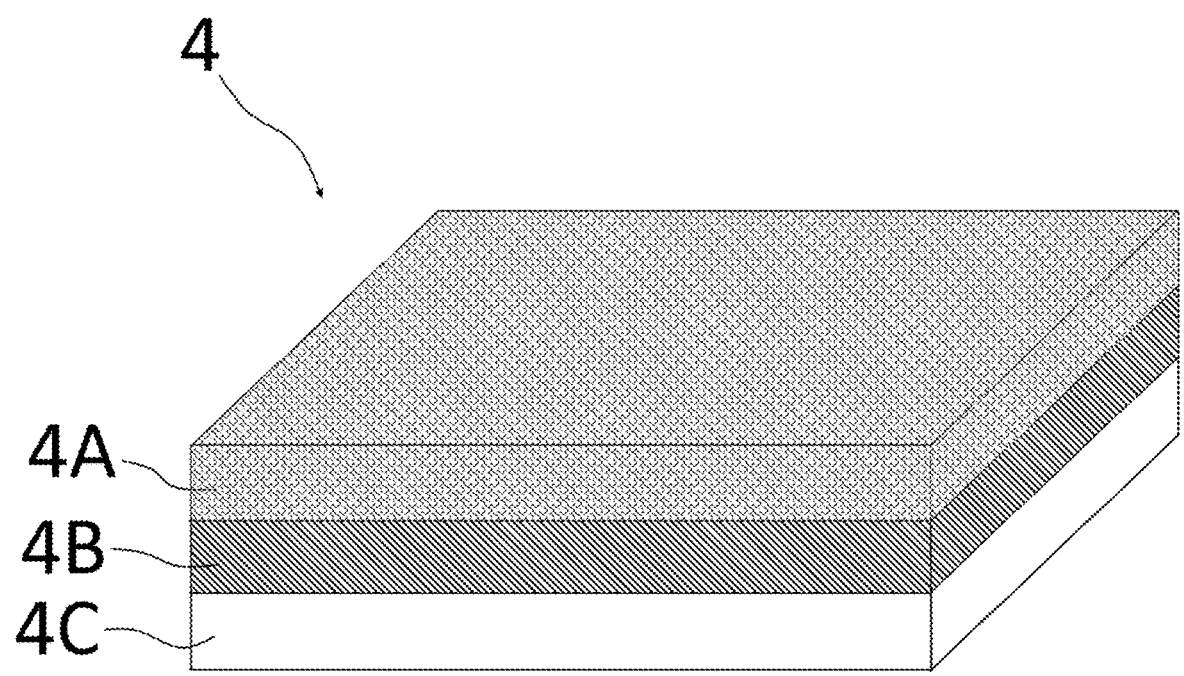
FIG. 7: A perspective cross-sectional view of an exemplary ferromagnetic element.

FIG. 7 shows a perspective cross-sectional view of an exemplary ferromagnetic element 4. The ferromagnetic element 4 is shown as being substantially planar or flat, this geometry not being restrictive. Instead, the ferromagnetic element 4 can have a different shape, for example a curved shape.

The ferromagnetic element 4 is shown in particular in a cuboid with a square base.

The ferromagnetic element 4 has a ferromagnetic layer 4A. The ferromagnetic layer 4A has a magnetic anisotropy or a magnetic anisotropy field in or parallel to the plane of the ferromagnetic element 4. Here, the plane of the ferromagnetic element 4 is a plane that is parallel to at least the ferromagnetic layer 4A. Alternatively or in addition, the ferromagnetic layer 4A can be configured such that a magnetic anisotropy or a magnetic anisotropy field can be generated in or parallel to the plane of the ferromagnetic element 4 by an external magnetic field.

The ferromagnetic layer 4A comprises at least one ferromagnetic material, preferably at least one soft magnetic ferromagnetic material. The at least one ferromagnetic material can in particular comprise materials based on Fe—Co—Hf—N, Fe—Co—Zr—N, Fe—Co—Ta—N, Fe—Co—B, and/or Fe—Co—B—Si. Furthermore, highly magnetostrictive rare earth elements (e.g. Tb, Dy, Sm) as an alloy additive can increase damping of the ferromagnetic resonance of the ferromagnetic layer 4A or of the at least one ferromagnetic element 4.

The ferromagnetic element 4 also has an intermediate layer 4B arranged between the ferromagnetic layer 4A and a substrate 4C and/or the torque transmission device 1. The intermediate layer 4B is configured to isolate and/or magnetically decouple the ferromagnetic layer 4A from the substrate 4C and/or the torque transmission device 1. The intermediate layer 4B preferably has substantially the same dimensions or sizes as the ferromagnetic layer 4A along the plane of the ferromagnetic element 4, which enables uniform magnetic decoupling. However, the intermediate layer 4B is not limited to such dimensions, but can e.g. have at least partially larger dimensions than the ferromagnetic layer 4A, whereby magnetic edge effects along an edge of the ferromagnetic layer 4A can be avoided or reduced.

Furthermore, the intermediate layer 4B can be configured to chemically and/or physically isolate the ferromagnetic layer 4A from the substrate 4C and/or the torque transmission device 1. In this way, for example, chemical reactions and/or diffusion processes between the ferromagnetic layer 4A and the substrate 4C and/or the torque transmission device 1 can be avoided or reduced. Furthermore, the intermediate layer 4B can in particular be configured to act as an adhesion promoter between the ferromagnetic layer 4A and the substrate 4C. The intermediate layer 4B can in particular comprise $Si_3N_4$ and/or AlN and/or layer materials with a high specific resistance (e.g. TiN and/or Ti—Al—N and/or TaN).

The ferromagnetic element 4 also has a substrate 4C, which is arranged between the ferromagnetic layer 4A and the torque transmission device 1, in particular between the intermediate layer 4B and the torque transmission device 1. As described above, the substrate 4C can in particular be designed as a carrier plate. The substrate 4C can in particular comprise glass or silicon oxide, silicon, metals, plastics and/or composite materials.

The substrate 4C can be designed as a base layer of the ferromagnetic element 4 during its production process, with an intermediate layer 4B, if required, and/or the ferromagnetic layer 4A being applied to the substrate 4C.

The substrate 4C can furthermore have a different chemical composition on a side facing the ferromagnetic layer 4A than on a side facing away from the ferromagnetic layer 4A. For example, the substrate 4C can be formed from silicon, the side facing the ferromagnetic layer 4A having a silicon oxide layer. The silicon oxide layer can preferably be produced by thermal oxidation of the substrate 4C, wherein the silicon oxide layer can fulfill the same function as the intermediate layer 4B. Therefore, depending on the substrate 4C used, the use or the provision of a separate intermediate layer 4B can be dispensed with.

Figure 8:
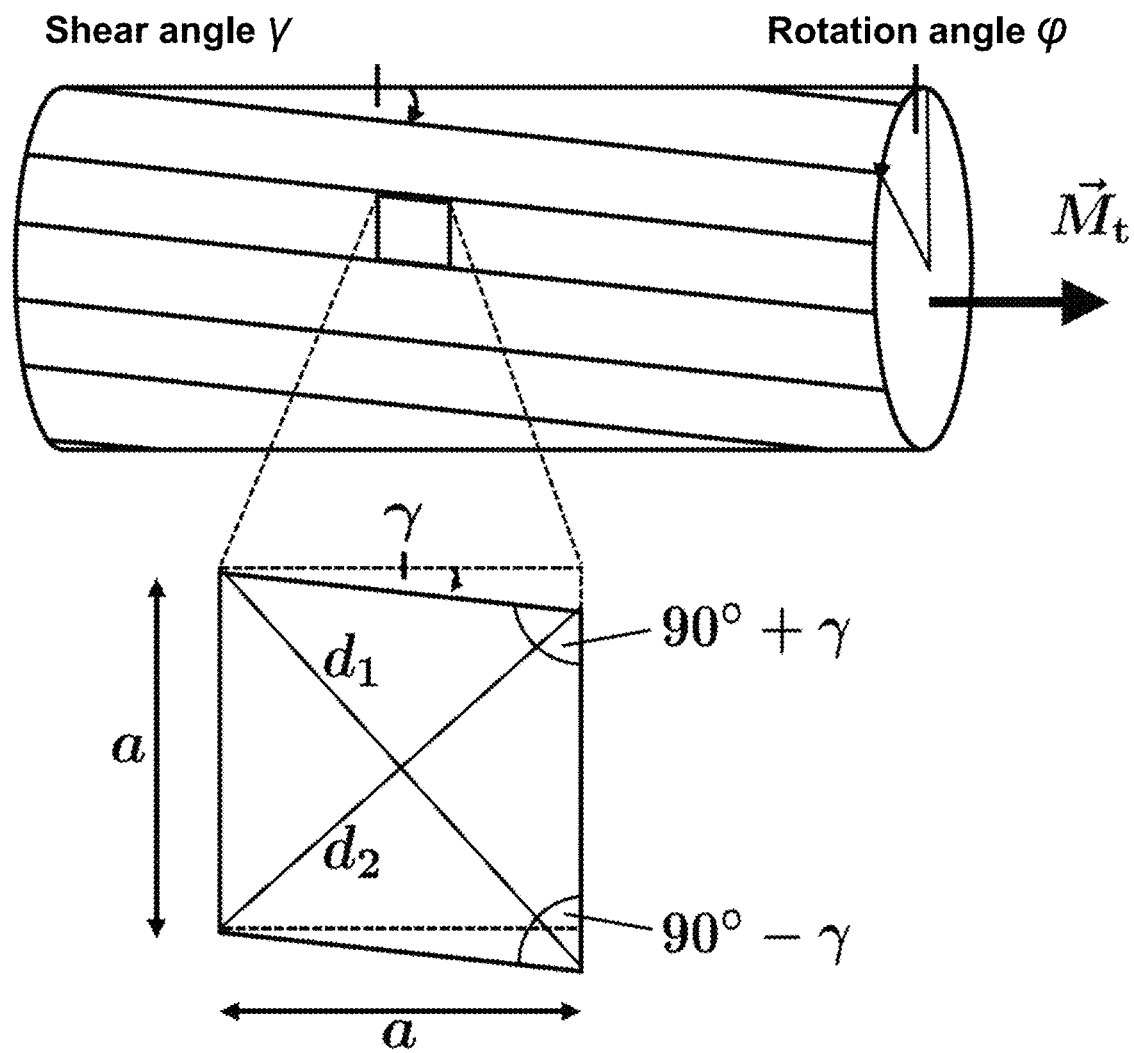
FIG. 8: A schematic representation of a bracing of a torque transmission device and a ferromagnetic element arranged thereon.

FIG. 8 shows a schematic representation of a bracing of a torque transmission device and a ferromagnetic element arranged thereon. Reference is made in particular to the above description, in particular with regard to equations (1) to (12), in which the theoretical background of the bracing is explained in more detail.

Figure 9:
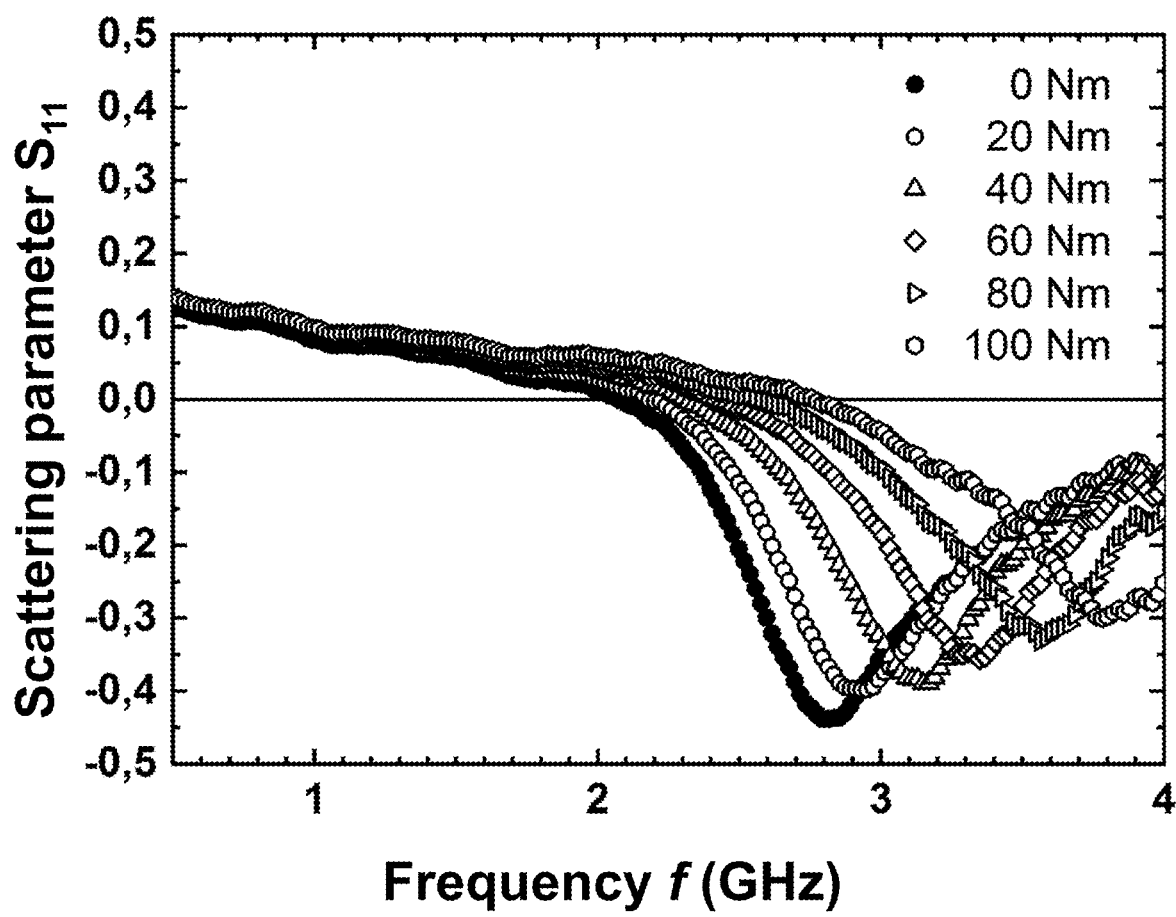
FIG. 9: Six measurement series of the ferromagnetic resonance frequency for the ferromagnetic element produced in Example 2.

FIG. 9 shows six measurement series of the ferromagnetic resonance frequency for the ferromagnetic element produced in Example 2, each measurement series being determined with a different torque applied to the torque transmission device. The ferromagnetic resonance frequency can be determined by the $S_{11}$ parameter profile (minimum of $S_{11}$) of the measuring device or by an imaginary part (Lorentz curve-shaped resonance peak profile) of the frequency-dependent permeability, which can be calculated or evaluated using the $S_{11}$ data. In particular, it can be seen that a shift in the ferromagnetic reference frequency is caused as the applied torque increases.

Figure 10:
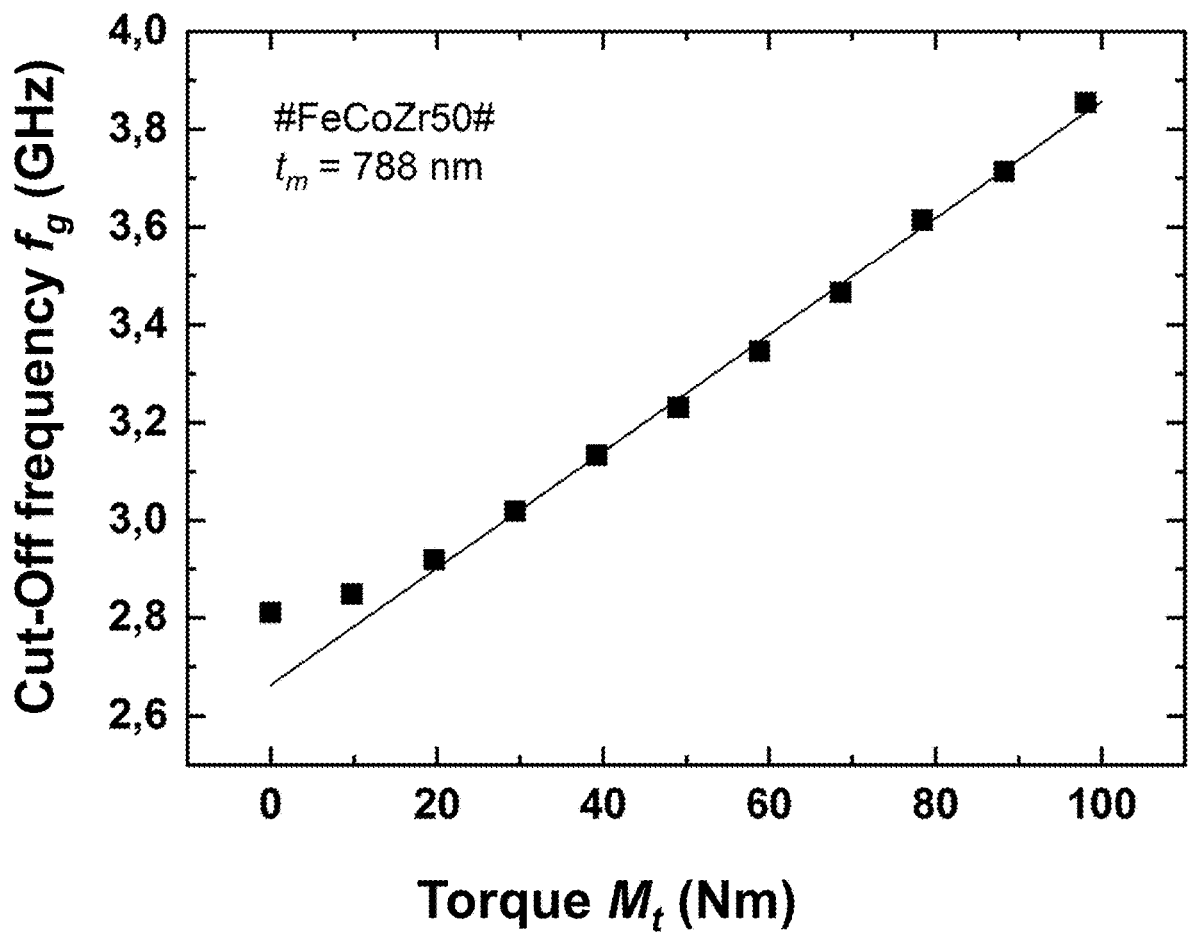
FIG. 10: A graphic representation of a ferromagnetic cut-off resonance frequency of the measurement series shown in FIG. 9.

FIG. 10 shows a graphic representation of a ferromagnetic cut-off resonance frequency of the measurement series shown in FIG. 9. Here, it can be seen that, from an applied torque of approx. 20 Nm onward, the ferromagnetic cut-off resonance frequency increases substantially linearly with increasing applied torque.

Figure 11:
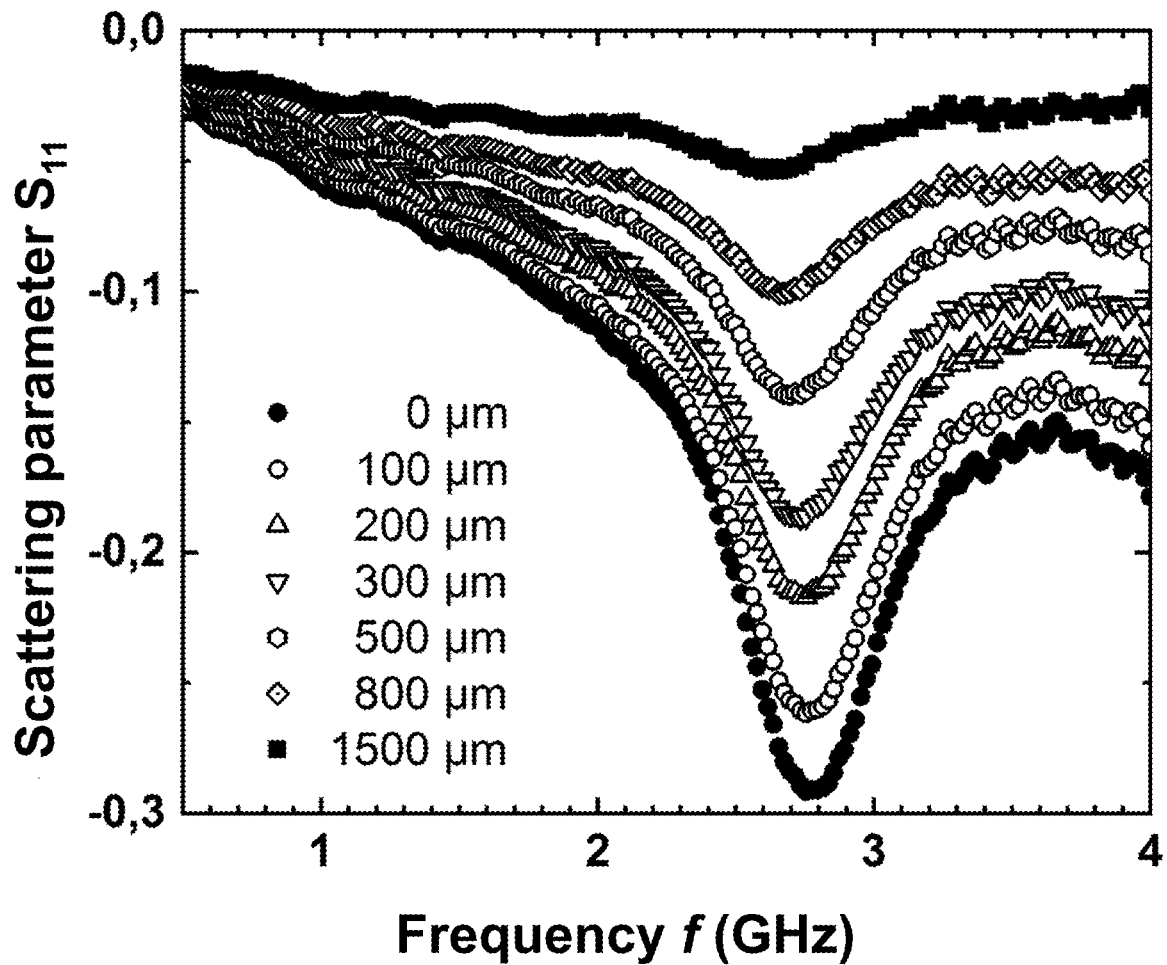
FIG. 11: A graphic representation of a plurality of measurement series of the ferromagnetic resonance frequency as a function of the distance between a measuring element and a ferromagnetic element in the measurement position.

FIG. 11 shows a graphic representation of a plurality of measurement series of the scattering parameter $S_{11}$ as a function of the distance between a measuring element and a ferromagnetic element in the measurement position. Here, a signal strength of the measured ferromagnetic resonance frequency increases with decreasing distance.

Figure 12:
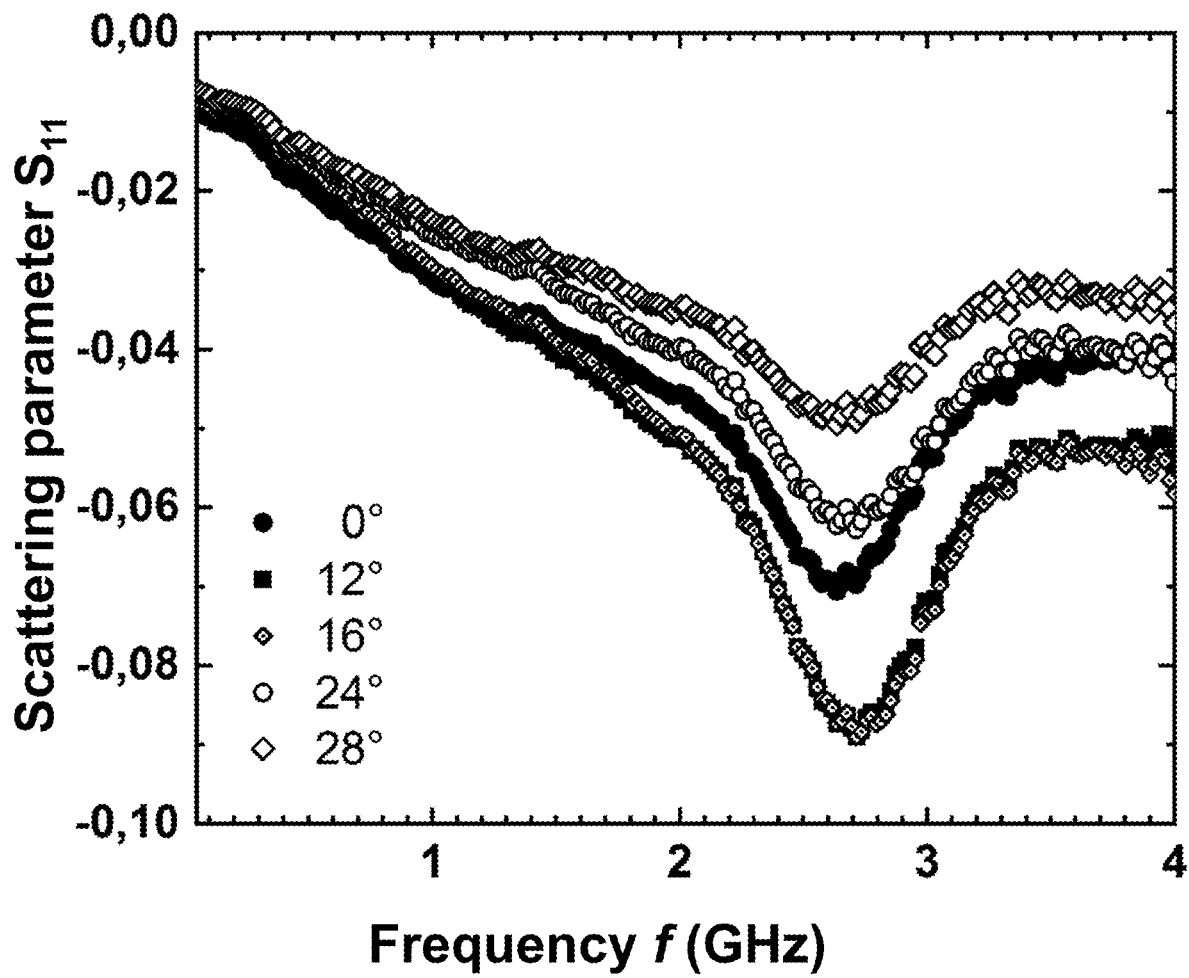
FIG. 12: A graphic representation of a plurality of measurement series of the ferromagnetic resonance frequency as a function of the measurement angle between a measurement element and a ferromagnetic element in the measurement position.

FIG. 12 shows a graphic representation of a plurality of measurement series of the ferromagnetic resonance frequency as a function of the measurement angle between a measuring element and a ferromagnetic element in the measurement position. Here, it can be seen in particular that a maximum or optimal signal strength of the measured ferromagnetic resonance is achieved at a measurement angle between 12° and 16°.

Figure 13A:
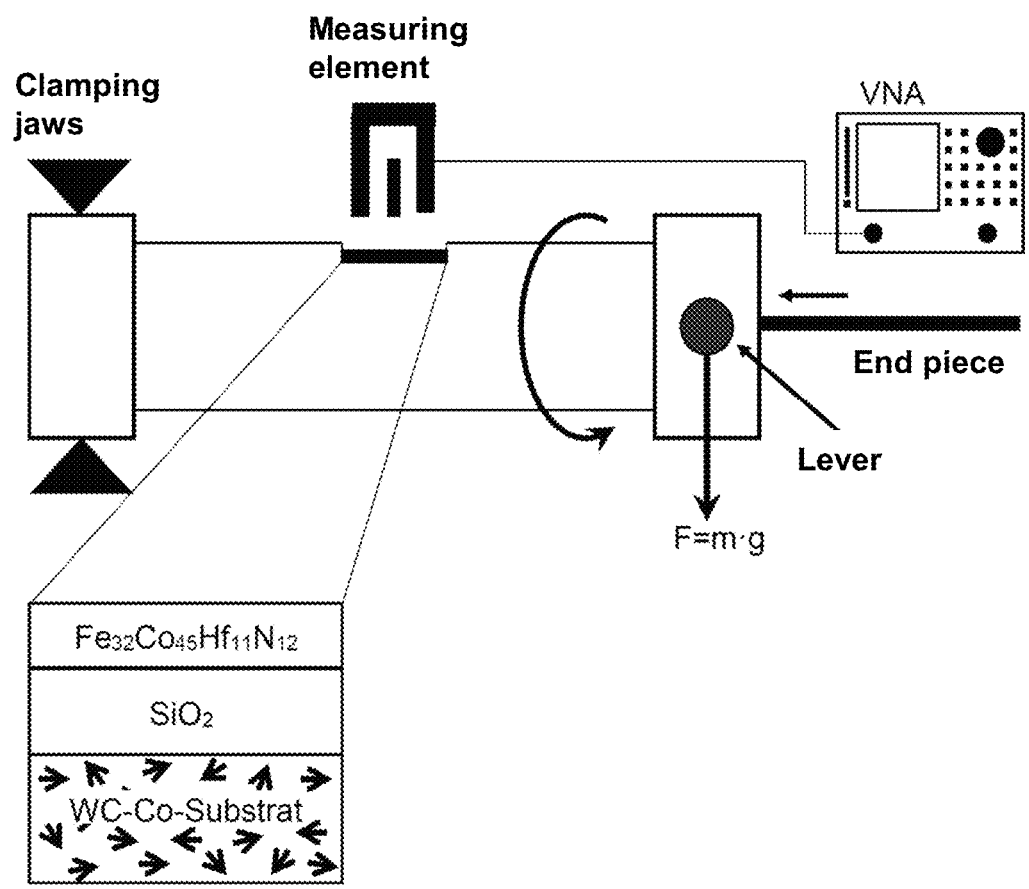
FIGS. 13A and 13B: An exemplary experimental measuring device for determining a ferromagnetic resonance frequency and a close-up view of an exemplary sensor apparatus.
Figure 13B:
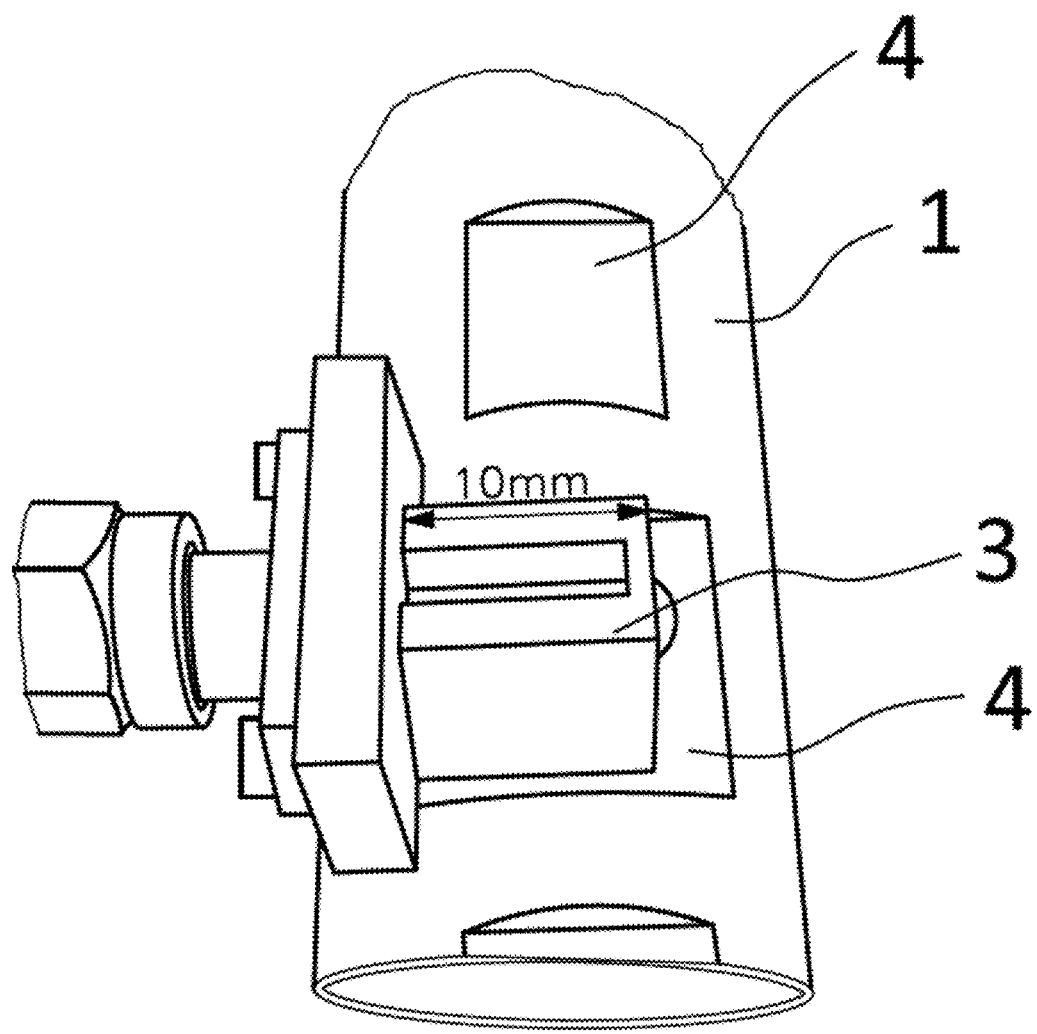

FIGS. 13A and 13B show an exemplary experimental measuring device for determining a ferromagnetic resonance frequency, as well as a close-up view of the exemplary sensor apparatus. The torque transmission device 1 or the shaft with an exemplary sensor apparatus is fixed at one end of the shaft by means of clamping jaws, while the other end of the shaft is rotatably supported on an end piece. A torque is applied to the shaft by means of a lever, the applied torque causing the ferromagnetic element 4 to be braced. A measuring element 3, in this case a high-frequency triplate stripline (see FIG. 13B), is used to measure or determine the ferromagnetic resonance frequency or the shift in the ferromagnetic resonance frequency with the aid of a VNA (Vector Network Analyzer). The measuring element 3 shown in FIG. 13B can in particular be used in a frequency range from 50 MHz to 5 GHz. The geometric dimensions of the measuring element 3, for example the high-frequency triplate stripline shown in FIG. 13B, depend in particular on its impedance. It was set in particular to 50 ohms for the high-frequency triplate stripline from FIG. 13B. This results in a distance between the ground plate and the signal line of the high-frequency triplate stripline of 0.7 mm with a length of the high-frequency triplate stripline of 10 mm.

Figure 14A:
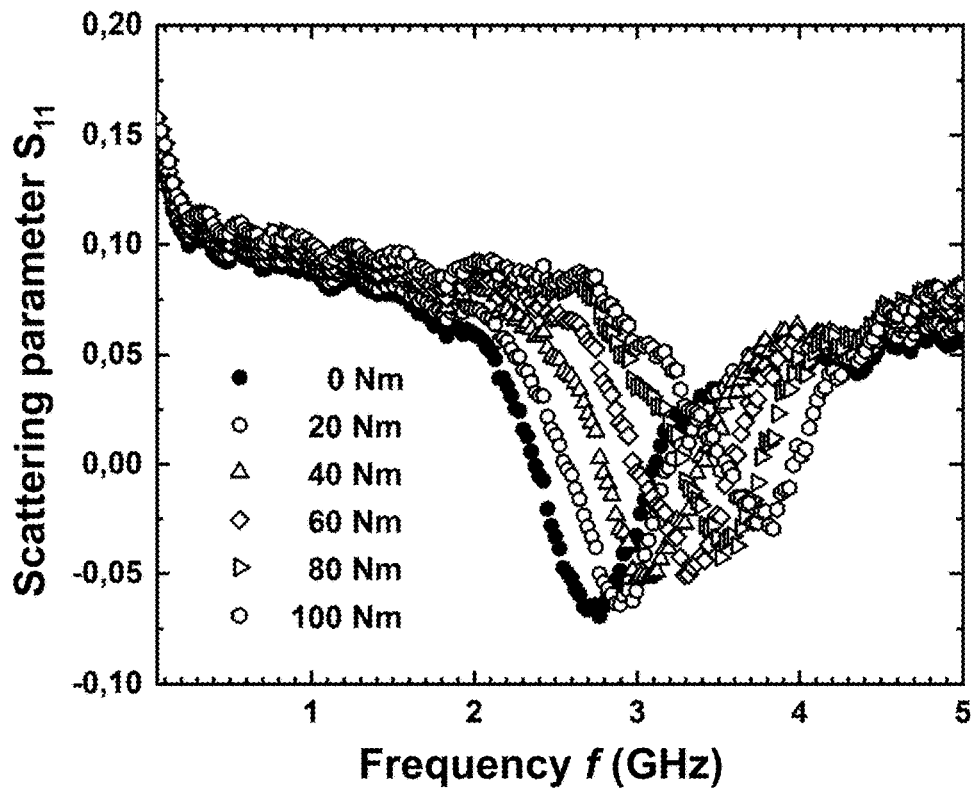
FIGS. 14A and 14B: A comparison of measurement series of the ferromagnetic resonance frequency of a ferromagnetic element produced as in Example 1 and a ferromagnetic element produced as in Example 2.
Figure 14B:
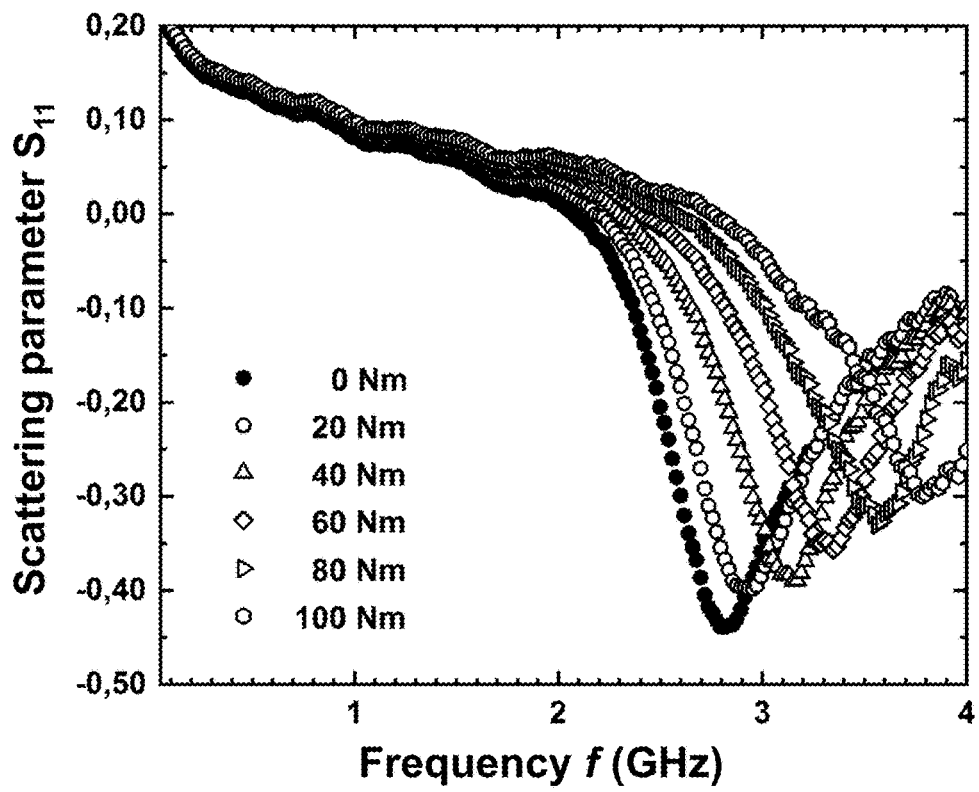

FIG. 14 shows a comparison of measurement series of the ferromagnetic resonance frequency. In FIG. 14A, measurement series with an applied torque of 0 Nm, 20 Nm, 40 Nm, 60 Nm, 80 Nm, and 100 Nm of a ferromagnetic element produced as in Example 1 are shown. In FIG. 14B, measurement series with an applied torque of 0 Nm, 20 Nm, 40 Nm, 60 Nm, 80 Nm, and 100 Nm of a ferromagnetic element produced as in Example 2 are shown. The measurement series of the ferromagnetic element produced in Example 2 are noticeably smoother or have a better signal-to-noise ratio and exhibit an increased signal strength compared to the measurement series shown in FIG. 14A. This is due in particular to the greater thickness of the ferromagnetic element produced in Example 2, and therefore to its greater magnetic volume.

Figure 15:
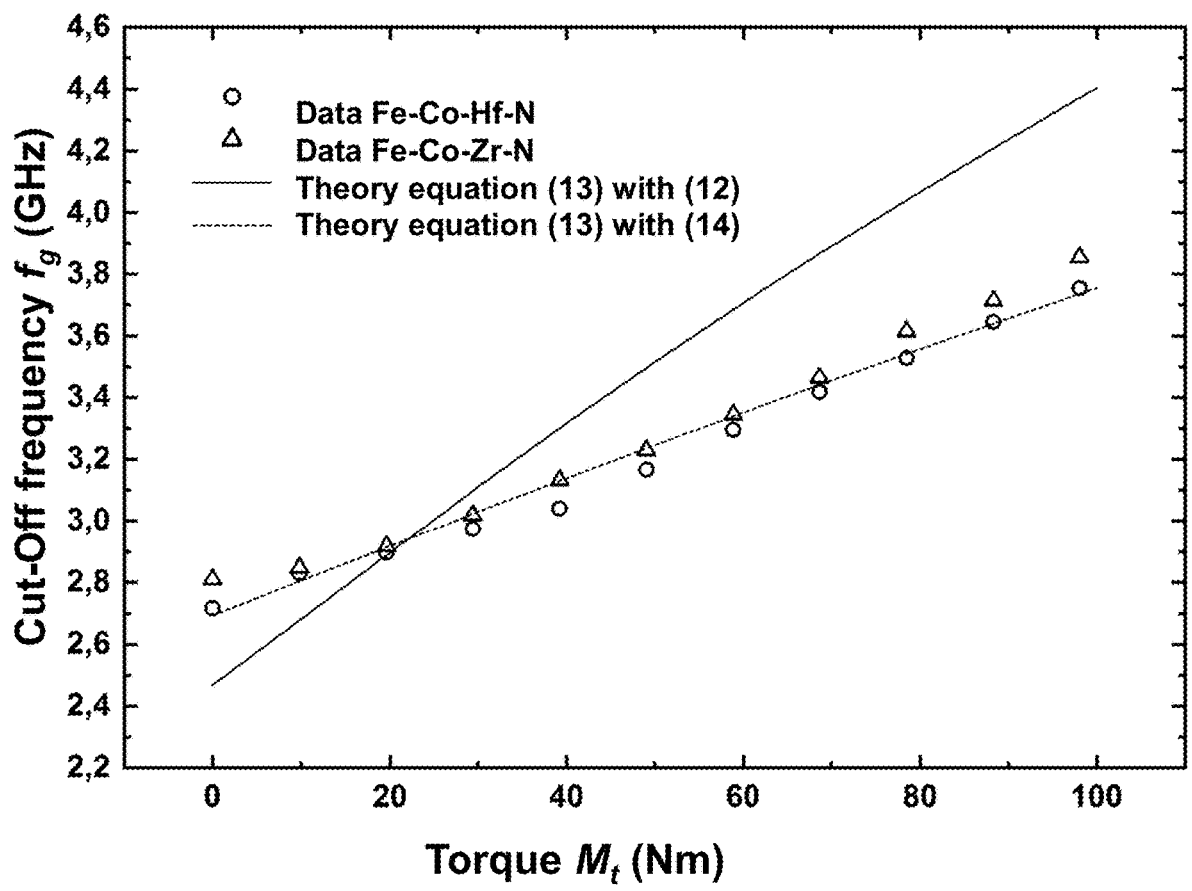
FIG. 15: A comparison of the theoretical values of the ferromagnetic resonance frequency on the basis of equation 13 with equation 12 and of equation 13 with equation 14.

FIG. 15 shows a comparison of the theoretical values of the ferromagnetic resonance frequency on the basis of equation 13 with equation 12 (ferromagnetic resonance frequency without taking into account an imperfect transmission of the torque through the connection between the ferromagnetic element and the torque transmission device) and of equation 13 with equation 14 (ferromagnetic resonance frequency taking into account an imperfect transmission of the torque through the connection between the ferromagnetic element and the torque transmission device). A comparison with measured values of the ferromagnetic resonance frequency of the ferromagnetic elements produced in Examples 1 and 2 shows that a theoretical ferromagnetic resonance frequency according to equation (13) with equation (14) reflects the measured values better than a theoretical ferromagnetic resonance frequency according to equation (13) with equation (12).

Figure 16:
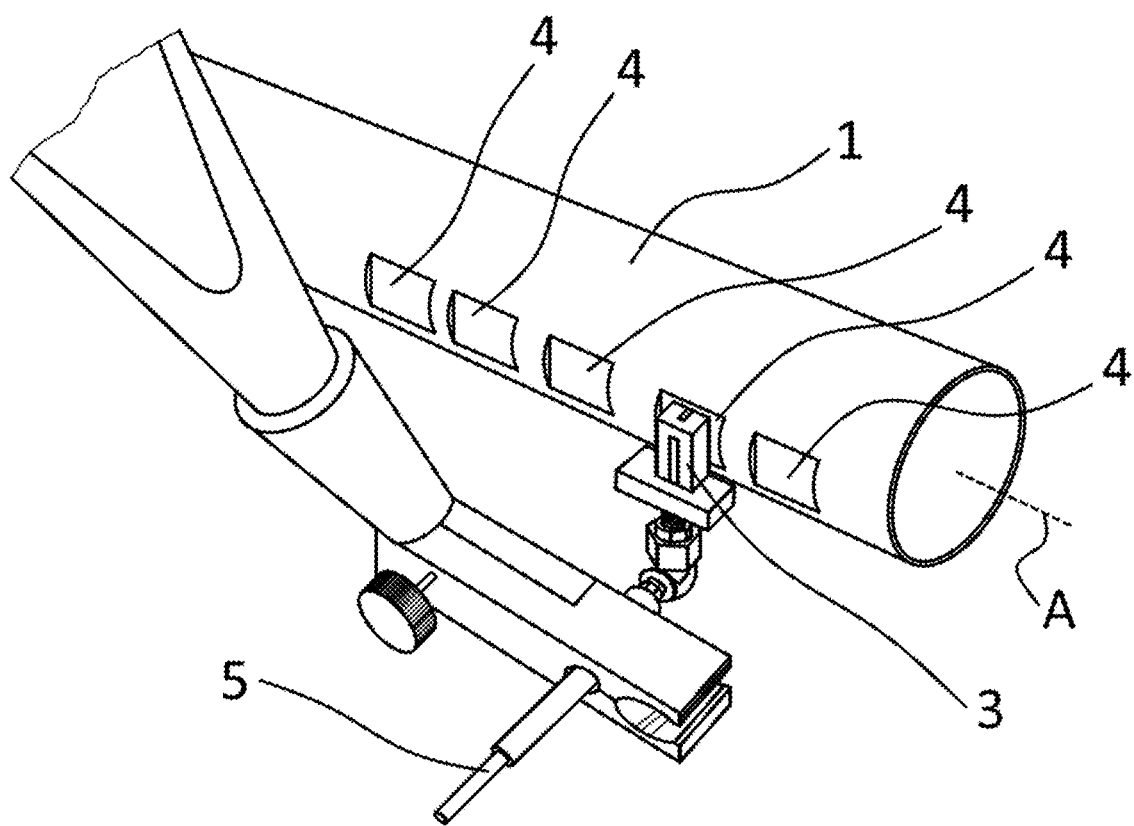
FIG. 16: A schematic representation of an exemplary sensor apparatus on a shaft.

FIG. 16 shows a schematic representation of an exemplary sensor apparatus on a shaft. FIG. 16 shows in particular a plurality of ferromagnetic elements 4 arranged linearly parallel to the rotation axis A of the shaft. Here, the ferromagnetic elements 4 can be arranged at the same or different distances from one another. In this way, for example, the sensor apparatus can be shifted along the shaft in order to enable the measurement of the ferromagnetic resonance frequency on a plurality of ferromagnetic elements 4. In particular, a plurality of sensor apparatuses can thereby additionally or alternatively be arranged on the shaft in order to determine or measure the ferromagnetic resonance frequency in a plurality of the ferromagnetic elements 4. In this way, for example, by comparing the measured values, a reliability of the determined torque can be increased and/or possibly faulty ferromagnetic elements 4 and/or possibly faulty measuring elements 3 can be determined and/or identified.

Figure 17:
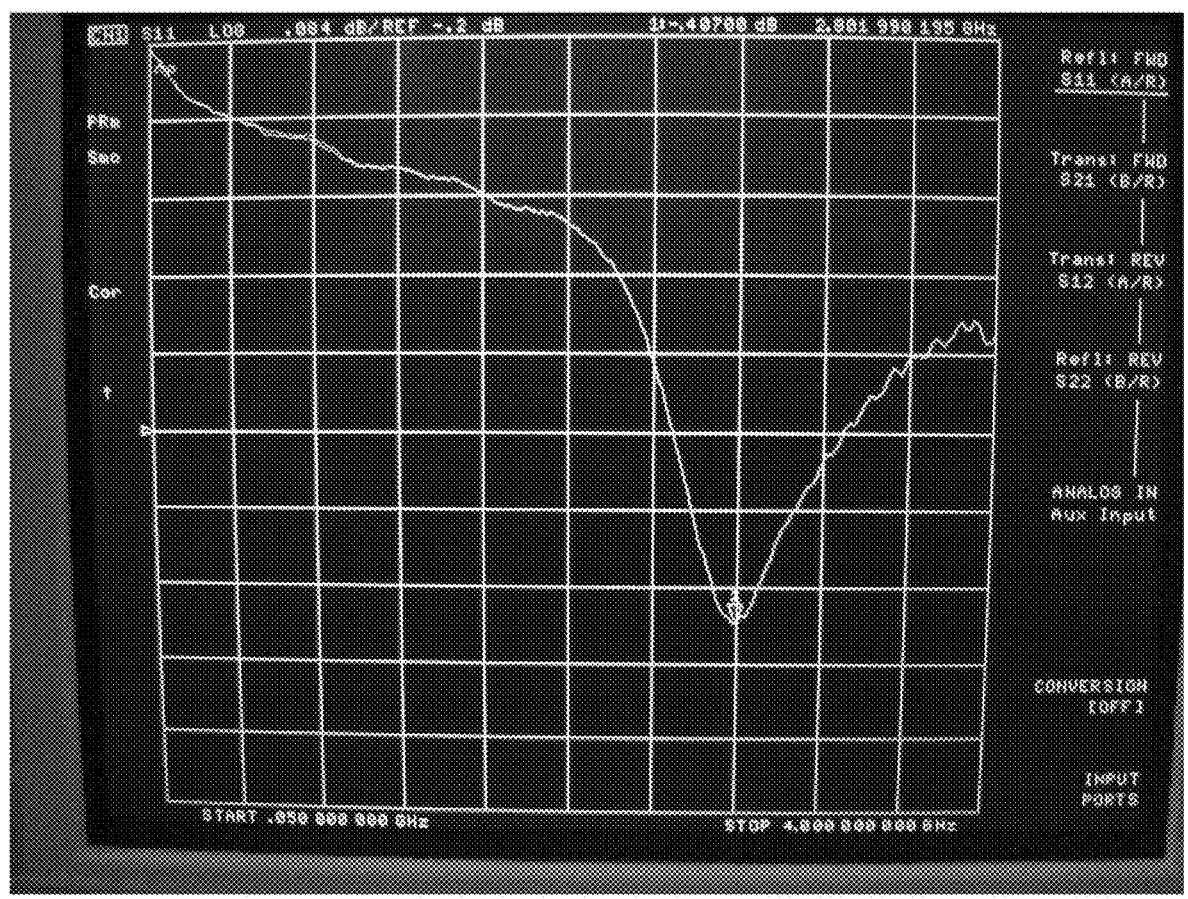
FIG. 17: A screenshot of a measurement series of the ferromagnetic resonance frequency according to the exemplary sensor apparatus shown in FIG. 16.

FIG. 17 shows a screenshot of a measurement series of the ferromagnetic resonance frequency according to the exemplary sensor apparatus shown in FIG. 16.

Figure 18A:
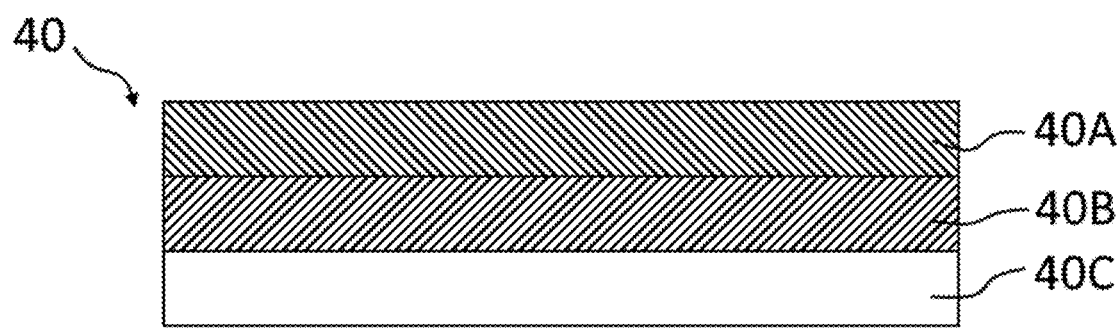
FIGS. 18A to 18D Perspective cross-sectional views of exemplary ferromagnetic elements.

FIG. 18A shows a perspective cross-sectional view of an exemplary ferromagnetic element 40. The ferromagnetic element 40 is shown schematically as being substantially planar or flat, this geometry not being restrictive. Instead, the ferromagnetic element 40 can have a different shape, for example a curved shape.

Figure 18B:
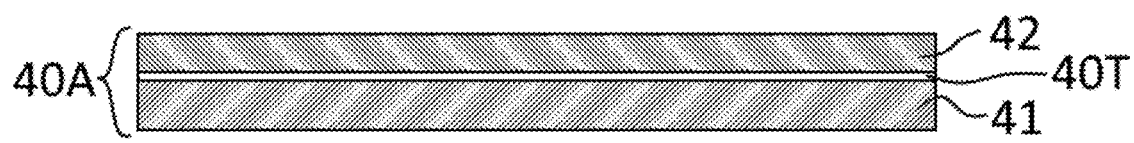
Figure 18C:
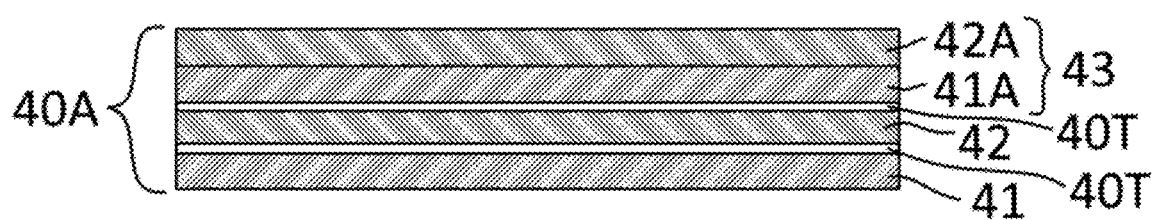
Figure 18D:
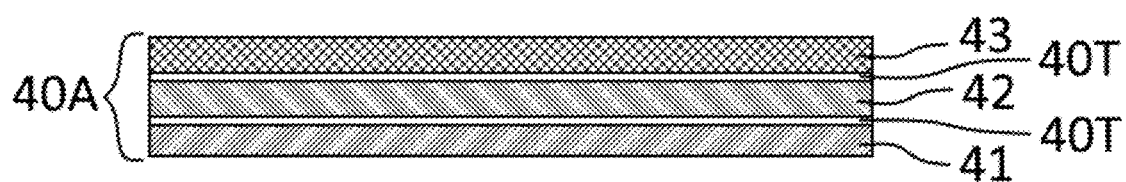

Here, the ferromagnetic element 40 in particular has two or more ferromagnetic layers, which are shown collectively as element 40A in FIG. 18A and are further described in FIGS. 18B to 18D. The two or more ferromagnetic layers can each have a magnetic anisotropy or a magnetic anisotropy field in or parallel to the plane of the ferromagnetic element 40. Here, the plane of the ferromagnetic element 40 is a plane that is parallel to at least the two or more ferromagnetic layers. Alternatively or in addition, the two or more ferromagnetic layers can be configured such that a magnetic anisotropy or a magnetic anisotropy field can be generated in or parallel to the plane of the ferromagnetic element 40 by an external magnetic field.

The ferromagnetic element 40 can furthermore have an intermediate layer 40B arranged between the two or more ferromagnetic layers and a substrate 40C and/or the torque transmission device 1. The intermediate layer 40B is configured to isolate and/or magnetically decouple the two or more ferromagnetic layers 40A from the substrate 40C and/or the torque transmission device 1. The intermediate layer 40B can in particular have any combination of the features of the intermediate layer 4B. The intermediate layer 40B, as well as the intermediate layer 4B, are optional though, and can preferably not be provided e.g. in torque transmission devices 1 that cannot interact magnetically with the two or more ferromagnetic layers.

The ferromagnetic element 40 also has a substrate 40C that is arranged between the two or more ferromagnetic layers and the torque transmission device 1, in particular between the intermediate layer 40B and the torque transmission device 1. In this case, the substrate 40C can in particular have any combination of the features of the substrate 4C.

FIG. 18B shows a perspective cross-sectional view of an exemplary element 40A of the ferromagnetic element 40, comprising two ferromagnetic layers 41, 42.

Here, element 40A has in particular at least a first ferromagnetic layer 41. The first ferromagnetic layer 41 can in particular be formed from at least a first ferromagnetic material. Element 40A also has in particular at least one second ferromagnetic layer 42. The second ferromagnetic layer 42 can in particular be formed from at least one second ferromagnetic material.

Furthermore, the first ferromagnetic layer 41 is separated from the second ferromagnetic layer 42 by at least one insulating, non-conductive separating layer 40T. The insulating, non-conductive separating layer 40T is designed in particular to magnetically decouple the first ferromagnetic layer 41 and the second ferromagnetic layer 42 or to prevent or reduce a magnetic interaction between the first ferromagnetic layer 41 and the second ferromagnetic layer 42. In particular, the first ferromagnetic layer 41 thus has a first ferromagnetic resonance frequency and the second ferromagnetic layer 42 has a second ferromagnetic resonance frequency, which can be measured or determined by the at least one measuring element 3.

FIG. 18C shows a perspective cross-sectional view of a further exemplary element 40A of the ferromagnetic element 40, comprising three ferromagnetic layers 41, 42, 43.

In particular, element 40A has at least a first ferromagnetic layer 41, a second ferromagnetic layer 42, and a third ferromagnetic layer 43, as well as at least two insulating, non-conductive separating layers 40T. Here, in particular a first one of the at least two insulating, non-conductive separating layers 40T is arranged between the first ferromagnetic layer 41 and the second ferromagnetic layer 42. Furthermore, in particular a second one of the at least two insulating, non-conductive separating layers 40T is arranged between the second ferromagnetic layer 42 and the third ferromagnetic layer 43. In particular, the second ferromagnetic layer 42 is arranged between the first ferromagnetic layer 41 and the third ferromagnetic layer 43. However, such an order of the two or more, in this case three, ferromagnetic layers is not to be regarded as restrictive. Instead, any order of the two or more ferromagnetic layers can be provided, and can be provided e.g. based on the respective materials of the two or more ferromagnetic layers.

The first ferromagnetic layer 41 is formed in particular from at least a first ferromagnetic material. The second ferromagnetic layer 42 is in particular formed from at least one second ferromagnetic material. As a result, the first ferromagnetic layer 41 has a first ferromagnetic resonance frequency and the second ferromagnetic layer 42 has a second ferromagnetic resonance frequency.

In particular, the third ferromagnetic layer 43 is designed as a multilayer. Here, the multilayer comprises at least a first sub-layer 41A made of the first ferromagnetic material and at least a second sub-layer 42A made of the second ferromagnetic material, which are applied or arranged directly on top of one another. Here, no further insulating, non-conductive separating layer 40T is arranged between the first sub-layer 41A and the second sub-layer 42A, as a result of which the first sub-layer 41A and the second sub-layer 42A are not magnetically decoupled from one another or a magnetic interaction between the first sub-layer 41A and the second sub-layer 42A is possible. As a result, the multilayer has a third ferromagnetic resonance frequency between the first ferromagnetic resonance frequency of the first ferromagnetic layer 41 and the second ferromagnetic resonance frequency of the second ferromagnetic layer 42.

The order of the at least two sub-layers 41A, 42A is shown here as an example only. In particular, any order of the at least two sub-layers 41A, 42A can be freely chosen, for example taking into account the first ferromagnetic layer 41 and the second ferromagnetic layer 42. Furthermore, the multilayer can e.g. have two or more sub-layers, in particular more than two sub-layers.

In particular, the first ferromagnetic layer 41 has a first ferromagnetic resonance frequency, the second ferromagnetic layer 42 has a second ferromagnetic resonance frequency, and the third ferromagnetic layer 43 has a third ferromagnetic resonance frequency, which can be measured or determined by the at least one measuring element 3.

FIG. 18D shows a perspective cross-sectional view of a further exemplary element 40A of the ferromagnetic element 40, comprising three ferromagnetic layers 41, 42, 43.

In particular, the element 40A has at least a first ferromagnetic layer 41, a second ferromagnetic layer 42, and a third ferromagnetic layer 43, as well as at least two insulating, non-conductive separating layers 40T. Here, in particular, a first one of the at least two insulating, non-conductive separating layers 40T is arranged between the first ferromagnetic layer 41 and the second ferromagnetic layer 42. Furthermore, in particular a second one of the at least two insulating, non-conductive separating layers 40T is arranged between the second ferromagnetic layer 42 and the third ferromagnetic layer 43. In particular, the second ferromagnetic layer 42 is arranged between the first ferromagnetic layer 41 and the third ferromagnetic layer 43.

Here, the first ferromagnetic layer 41 is formed in particular from at least a first ferromagnetic material. The second ferromagnetic layer 42 is in particular formed from at least one second ferromagnetic material. The third ferromagnetic layer 43 is in particular formed from at least one third ferromagnetic material. In particular, the first ferromagnetic layer 41 has a first ferromagnetic resonance frequency, the second ferromagnetic layer 42 has a second ferromagnetic resonance frequency, and the third ferromagnetic layer 43 has a third ferromagnetic resonance frequency, which can be measured or determined by the at least one measuring element 3.

The exemplary embodiments discussed and illustrated in the description and in the figures are not to be interpreted as restrictive. Instead, a sensor apparatus and/or a method can have any combination of the features mentioned in the description and shown in the figures.

REFERENCE NUMERAL LIST 1 torque transmission device
2 magnetic field element
3 measuring element
4 ferromagnetic element
4A ferromagnetic layer 40A element
41 first ferromagnetic layer
42 second ferromagnetic layer
43 third ferromagnetic layer
4B, 40B intermediate layer
4C, 40C substrate
40T insulating, non-conductive separating layer
41A, 42A sub-layer
5 connecting element
A rotation axis of a torque transmission device

The invention claimed is:

1. A sensor apparatus, comprising:
   at least one ferromagnetic element arrangeable on a torque transmission device in an operating state; and
   a measuring device comprising at least one measuring element, wherein each measuring element is configured to measure a ferromagnetic resonance frequency of the at least one ferromagnetic element,
   wherein the measuring device is configured to determine a torque of the torque transmission device based on a shift in the measured ferromagnetic resonance frequency, and
   wherein the at least one ferromagnetic element has at least one ferromagnetic layer.

2. The sensor apparatus according to claim 1, wherein the at least one ferromagnetic element has at least a first ferromagnetic layer and a second ferromagnetic layer, and wherein the at least one ferromagnetic element has at least one insulating, non-conductive separating layer arranged between the first ferromagnetic layer and the second ferromagnetic layer and configured to magnetically decouple the first ferromagnetic layer and the second ferromagnetic layer from one another.

3. The sensor apparatus according to claim 1, wherein each of the at least one ferromagnetic layer respectively has a thickness of at most 500 μm, and/or at least 50 nm; and/or wherein the thickness of the respective at least one ferromagnetic layer and/or a thickness of the at least one ferromagnetic element are substantially constant.

4. The sensor apparatus according to claim 1, wherein the at least one ferromagnetic element has at least one intermediate layer arranged between the at least one ferromagnetic layer and the torque transmission device in the operating state, wherein the at least one intermediate layer is configured to magnetically decouple the at least one ferromagnetic layer and the torque transmission device in the operating state, and wherein the at least one intermediate layer has a thickness of at most 500 μm and/or at least 200 nm.

5. The sensor apparatus according to claim 1, wherein the at least one ferromagnetic element has at least one substrate arranged between the at least one ferromagnetic layer and the torque transmission device in the operating state.

6. The sensor apparatus according to claim 1, wherein the at least one ferromagnetic element is connectable to the torque transmission device in the operating state by gluing, welding, pressing, chemical reaction and/or latching in order to transmit a mechanical tension caused by the torque from the torque transmission device to the at least one ferromagnetic element, and wherein the measuring device is configured to determine the torque of the torque transmission device based on a shift in the measured ferromagnetic resonance frequency, wherein an imperfect transmission of the mechanical tension through the connection of the torque transmission device and the at least one ferromagnetic element is taken into account, and wherein the measuring device is configured to determine an imperfect transmission of the mechanical tension through the connection of the torque transmission device and the at least one ferromagnetic element in a calibration step.

7. The sensor apparatus according to claim 1, wherein at least one measuring element is configured to measure or determine the ferromagnetic resonance frequency of the at least one ferromagnetic element using a frequency sweep; and/or wherein, in the operating state, a smallest distance between at least one measuring element and at least one ferromagnetic element has a value of at most 1500 μm; and/or wherein, during a measurement of the ferromagnetic resonance frequency of at least one ferromagnetic element, a measurement angle between a surface of the at least one measuring element and the at least one ferromagnetic element has a value of at least 0 and at most 28; and/or wherein the torque transmission device is designed as a shaft.

8. The sensor apparatus according to claim 1, wherein at least one measuring element of the at least one measuring elements is designed as a high-frequency triplate stripline, and wherein the high-frequency triplate stripline is configured to be operated in a reflection mode of an electromagnetic high-frequency wave guided in a defined manner, and wherein the high-frequency triplate stripline is configured to receive or measure at least one reflection signal in the reflection mode for measurement of the ferromagnetic resonance frequency, and wherein the at least one reflection signal is determinable or measurable at a fixed measurement frequency.

9. The sensor apparatus according to claim 1, wherein the at least one measuring element is arranged along a measurement plane in the operating state, wherein the measurement plane is designed substantially tangential to a surface of the torque transmission device; or wherein the at least one measuring element at least partially surrounds the torque transmission device substantially along a circumferential direction with respect to a rotation axis of the torque transmission device in the operating state.

10. The sensor apparatus according to claim 1, wherein the at least one ferromagnetic element is designed as at least one circumferential ferromagnetic element, wherein the at least one circumferential ferromagnetic element substantially completely surrounds the torque transmission device along a circumferential direction with respect to a rotation axis of the torque transmission device in the operating state; or wherein the at least one ferromagnetic element comprises at least two ferromagnetic elements, wherein the at least two ferromagnetic elements are arranged on the torque transmission device in a circumferential direction with respect to a rotation axis of the torque transmission device, wherein:
   at least one of the at least two ferromagnetic elements is designed substantially planar and, in the operating state, is oriented substantially parallel to a tangential plane of the surface of the torque transmission device; and/or
   at least one of the at least two ferromagnetic elements is designed as a partially circumferential ferromagnetic element and, in the operating state, at least partially surrounds the torque transmission device along a circumferential direction with respect to a rotation axis of the torque transmission device.

11. The sensor apparatus according to claim 1, wherein the at least one ferromagnetic element has a magnetic anisotropy; and/or wherein the measuring device further comprises at least one magnetic field element, wherein the at least one magnetic field element is configured to generate a magnetic field in the operating state in order to generate or influence a magnetic anisotropy in the at least one ferromagnetic element.

12. A method for determining a torque of a torque transmission device, the method comprising:
- arranging at least one ferromagnetic element on the torque transmission device, wherein the at least one ferromagnetic element has at least one ferromagnetic layer;
- measuring a ferromagnetic resonance frequency of the at least one ferromagnetic element; and
- determining the torque of the torque transmission device based on a shift in the measured ferromagnetic resonance frequency.

13. The method according to claim 12, wherein arranging the at least one ferromagnetic element comprises gluing, welding, pressing, chemical reaction and/or latching of the at least one ferromagnetic element to the torque transmission device, and wherein determining the torque of the torque transmission device comprises taking into account an imperfect transmission of mechanical tension through a connection between the torque transmission device and the at least one ferromagnetic element, and wherein the method further comprises determining the imperfect transmission of the mechanical tension through the connection between the torque transmission device and the at least one ferromagnetic element.

14. The method according to claim 12, further comprising producing the at least one ferromagnetic layer, wherein producing the at least one ferromagnetic layer comprises at least:
- producing a first ferromagnetic layer,
- producing a first insulating, non-conductive separating layer on the first ferromagnetic layer, and
- producing a second ferromagnetic layer on the first insulating, non-conductive separating layer.

15. The method according to claim 14, further comprising:
- producing a substrate; and
- producing an intermediate layer on the substrate,
- wherein a ferromagnetic layer of the at least one ferromagnetic layer is produced on the intermediate layer, the intermediate layer being configured to magnetically decouple the at least one ferromagnetic layer and the torque transmission device in an operating state.

16. The method according to claim 12, further comprising:
- annealing the at least one ferromagnetic element in an external static magnetic field to generate a magnetic anisotropy of the at least one ferromagnetic element.

* * * * *

UNITED STATES PATENT AND TRADEMARK OFFICE
CERTIFICATE OF CORRECTION

| | | |
|---|---|---|
| PATENT NO. | : 12,044,587 B2 | Page 1 of 1 |
| APPLICATION NO. | : 17/344723 | |
| DATED | : July 23, 2024 | |
| INVENTOR(S) | : Klaus Seemann, Harald Leiste and Stefan Beirle | |

It is certified that error appears in the above-identified patent and that said Letters Patent is hereby corrected as shown below:

On the Title Page

Item (72), the address for the Inventor Stefan Beirle delete "Amstettan (DE)" and insert -- Amstetten (DE) --.

Signed and Sealed this
Eleventh Day of March, 2025

Coke Morgan Stewart
*Acting Director of the United States Patent and Trademark Office*